United States Patent
Covaci et al.

(10) Patent No.: US 11,658,801 B2
(45) Date of Patent: May 23, 2023

(54) SYSTEM FOR SECURING VERIFICATION KEY FROM ALTERATION AND VERIFYING VALIDITY OF A PROOF OF CORRECTNESS

(71) Applicant: nChain Licensing AG, Zug (CH)

(72) Inventors: Alexandra Covaci, Canterbury (GB); Simone Madeo, London (GB); Patrick Motylinski, London (GB); Stephane Vincent, Luxembourg (LU)

(73) Assignee: nChain Licensing AG, Zug (CH)

( * ) Notice: Subject to any disclaimer, the term of this patent is extended or adjusted under 35 U.S.C. 154(b) by 250 days.

(21) Appl. No.: 16/762,471

(22) PCT Filed: Oct. 29, 2018

(86) PCT No.: PCT/IB2018/058433
§ 371 (c)(1),
(2) Date: May 7, 2020

(87) PCT Pub. No.: WO2019/092543
PCT Pub. Date: May 16, 2019

(65) Prior Publication Data
US 2020/0266985 A1    Aug. 20, 2020

(30) Foreign Application Priority Data

Nov. 9, 2017   (GB) .................................... 1718505
Nov. 30, 2017  (GB) .................................... 1719998
(Continued)

(51) Int. Cl.
H04L 29/06      (2006.01)
H04L 9/06       (2006.01)
(Continued)

(52) U.S. Cl.
CPC .............. *H04L 9/0618* (2013.01); *G06F 8/44* (2013.01); *G06F 8/447* (2013.01); *G06F 8/451* (2013.01);
(Continued)

(58) Field of Classification Search
None
See application file for complete search history.

(56) References Cited

U.S. PATENT DOCUMENTS 4,667,290 A    5/1987  Goss et al.
5,297,150 A    3/1994  Clark
(Continued)

FOREIGN PATENT DOCUMENTS

CN    107179932 A    9/2017
CN    107274184 A    10/2017
(Continued)

OTHER PUBLICATIONS

Jakob Eberhardt: "ZoKrates—A Toolbox for zkSNARKs on Ethereum", Youtube, Nov. 4, 2017 (Nov. 4, 2017), p. 1 pp., XP054979013, Retrieved from the Internet: URL:https://www.youtube.com/watch?v=sSlryw_b5J 0&t=4s (Year: 2017).*

(Continued)

*Primary Examiner* — Andrew J Steinle
(74) *Attorney, Agent, or Firm* — Davis Wright Tremaine LLP

(57) ABSTRACT

The invention relates to distributed ledger technologies such as consensus-based blockchains. A blockchain transaction may include digital resources that are encumbered by a locking script that encodes a set of conditions that must be fulfilled before the encumbered resources may be used (e.g., transferring ownership/control of encumbered resources). A worker (e.g., a computer system) performs one or more computations to generate a proof, which is encoded as part (Continued)

US 11,658,801 B2

Page 2 of an unlocking script. A verification algorithm may utilize the proof, a verification key, and additional data such as a cryptographic material associated with the worker (e.g., a digital signature) to verify that digital assets of the transaction should be transferred. As a result of the validation of this transaction, any third party is able to check the contract was executed corrected rather than re-executing the contract, thus saving computational power.

19 Claims, 8 Drawing Sheets

(30) Foreign Application Priority Data

| Dec. 13, 2017 | (GB) | .................................... | 1720768 |
| Feb. 2, 2018 | (GB) | .................................... | 1801753 |
| Apr. 10, 2018 | (GB) | .................................... | 1805948 |
| Apr. 20, 2018 | (GB) | .................................... | 1806444 |

(51) Int. Cl.

| *H04L 9/32* | (2006.01) |
| *H04L 9/40* | (2022.01) |
| *G06F 8/41* | (2018.01) |
| *G06F 9/445* | (2018.01) |
| *G06Q 20/40* | (2012.01) |
| *G06F 16/27* | (2019.01) |
| *H04L 9/30* | (2006.01) |
| *H04L 9/00* | (2022.01) |

(52) U.S. Cl.
CPC .......... *G06F 9/44521* (2013.01); *G06F 16/27* (2019.01); *G06Q 20/401* (2013.01); *G06Q 20/405* (2013.01); *H04L 9/0637* (2013.01); *H04L 9/0643* (2013.01); *H04L 9/30* (2013.01); *H04L 9/3218* (2013.01); *H04L 9/3236* (2013.01); *H04L 9/3239* (2013.01); *H04L 9/3247* (2013.01); *H04L 9/3263* (2013.01); *H04L 63/12* (2013.01); *H04L 9/3066* (2013.01); *H04L 9/50* (2022.05); *H04L 2209/34* (2013.01); *H04L 2209/56* (2013.01)

(56) References Cited

U.S. PATENT DOCUMENTS

| 5,404,531 A | 4/1995 | Wakatani |
| 5,499,191 A | 3/1996 | Young |
| 5,920,830 A | 7/1999 | Hatfield et al. |
| 6,519,754 B1 | 2/2003 | McElvain et al. |
| 7,085,701 B2 | 8/2006 | Rich et al. |
| 7,209,555 B2 | 4/2007 | Futa et al. |
| 7,281,017 B2 | 10/2007 | Hostetter et al. |
| 7,590,236 B1 | 9/2009 | Boneh et al. |
| 8,165,287 B2 | 4/2012 | Ghouti et al. |
| 8,331,556 B2 | 12/2012 | Billet et al. |
| 8,607,129 B2 | 12/2013 | Radhakrishnan et al. |
| 8,824,670 B2 | 9/2014 | Icart et al. |
| 9,026,978 B1 | 5/2015 | Liu et al. |
| 9,286,602 B2 | 3/2016 | Rosati et al. |
| 9,483,596 B1 | 11/2016 | Badar et al. |
| 9,569,771 B2 | 2/2017 | Lesavich et al. |
| 10,135,607 B1 | 11/2018 | Roets |
| 2003/0125917 A1 | 7/2003 | Rich et al. |
| 2004/0015739 A1 | 1/2004 | Heinkel et al. |
| 2006/0149962 A1 | 7/2006 | Fountain et al. |
| 2007/0061487 A1 | 3/2007 | Moore et al. |
| 2007/0157132 A1 | 7/2007 | Cheng et al. |
| 2008/0127067 A1 | 5/2008 | Aubertine et al. |
| 2010/0067686 A1 | 3/2010 | Minematsu |
| 2010/0131933 A1 | 5/2010 | Kim et al. |
| 2010/0272209 A1 | 10/2010 | Lee et al. |
| 2011/0200188 A1 | 8/2011 | Ghouti et al. |
| 2013/0031446 A1 | 1/2013 | Kamiya |
| 2013/0097420 A1 | 4/2013 | Zaverucha |
| 2014/0321644 A1 | 10/2014 | Lemieux |
| 2015/0379510 A1 | 12/2015 | Smith |
| 2016/0004820 A1 | 1/2016 | Moore |
| 2016/0087802 A1 | 3/2016 | Peeters |
| 2016/0162897 A1 | 6/2016 | Feeney |
| 2016/0283941 A1 | 9/2016 | Andrade |
| 2016/0357948 A1 | 12/2016 | Takeuchi |
| 2017/0091750 A1 | 3/2017 | Maim |
| 2017/0131983 A1 | 5/2017 | Roytman et al. |
| 2017/0132619 A1 | 5/2017 | Miller et al. |
| 2017/0140408 A1 | 5/2017 | Wuehler |
| 2017/0142103 A1 | 5/2017 | Bringer et al. |
| 2017/0177312 A1 | 6/2017 | Boehm et al. |
| 2017/0178263 A1 | 6/2017 | Kraemer et al. |
| 2017/0180341 A1 | 6/2017 | Walker et al. |
| 2017/0220815 A1 | 8/2017 | Ansari et al. |
| 2017/0249716 A1 | 8/2017 | Meixner et al. |
| 2017/0277909 A1 | 9/2017 | Kraemer et al. |
| 2017/0278100 A1 | 9/2017 | Kraemer et al. |
| 2017/0279611 A1 | 9/2017 | Kraemer et al. |
| 2017/0286079 A1 | 10/2017 | Cho et al. |
| 2017/0286717 A1 | 10/2017 | Khi et al. |
| 2017/0287090 A1 | 10/2017 | Hunn et al. |
| 2017/0317834 A1 | 11/2017 | Smith et al. |
| 2017/0337319 A1 | 11/2017 | Camus et al. |
| 2017/0352209 A1 | 12/2017 | Keuffer et al. |
| 2017/0353309 A1 | 12/2017 | Gray |
| 2018/0034634 A1 | 2/2018 | Benarroch Guenun et al. |
| 2018/0039667 A1 | 2/2018 | Pierce et al. |
| 2018/0117446 A1 | 5/2018 | Tran et al. |
| 2018/0167201 A1 | 6/2018 | Naqvi |
| 2019/0095631 A1 | 3/2019 | Roets et al. |
| 2019/0138753 A1 | 5/2019 | Wallrabenstein |
| 2019/0295182 A1 | 9/2019 | Kfir et al. |

FOREIGN PATENT DOCUMENTS

| EP | 3249599 A1 | 11/2017 |
| JP | 5697153 B2 | 4/2015 |
| WO | 2016155804 A1 | 10/2016 |
| WO | 2016206567 A1 | 12/2016 |
| WO | 2017008829 A1 | 1/2017 |
| WO | 2017079652 A1 | 5/2017 |
| WO | 2017145010 A1 | 8/2017 |
| WO | 2017148527 A1 | 9/2017 |
| WO | 2017178956 A1 | 10/2017 |
| WO | 2018127446 A1 | 7/2018 |
| WO | 2018127456 A2 | 7/2018 |

OTHER PUBLICATIONS

Andreas M. Antonopoulos: "Mastering Bitcoin—Unlocking Digital Cryptocurrencies" In: "Mastering bitcoin : [unlocking digital cryptocurrencies]", Dec. 20, 2014 (Dec. 20, 2014), O'Reilly Media, Beijing Cambridge Farnham Koln Sebastopol Tokyo, XP055306939, ISBN: 978-1-4493-7404-4 p. 134-138, p. 124 (Year: 2014).*
Matteo Campanelli et al: "Zero-Knowledge Contingent Payments Revisited: Attacks and Payments for Services", IACR, International Association for Cryptologic Research, vol. 20171101:190916 Jun. 9, 2017 (Jun. 9, 2017), p. 1-26, XP061023635, Retrieved from the Internet: URL:http://eprint.iacr.org/2017/566.pdf (Year: 2017).*
Antonopoulos, "Mastering Bitcoin—Unlocking Digital Cryptocurrencies," O'Reilly Media, Inc., Dec. 20, 2014, 282 pages.
Ben-Sasson et al. "Scalable Zero Knowledge via Cycles of Elliptic Curves" [online] IACR, Sep. 18, 2016 [retrieved Feb. 10, 2022]. Retrieved from https://eprint.iacr.org/2014/595.pdf, 2016, 49 pages.
Ben-Sasson et al., "SNARKs for C: Verifying program executions succinctly and in zero knowledge," Advances in Cryptology—CRYPTO 2013, Aug. 18, 2013, 19 pages.
Ben-Sasson et al., "Succinct Non-Interactive Zero Knowledge for a von Neumann Architecture," USENIX Security 2014, first disclosed Dec. 30, 2013, last revised May 19, 2015, https://eprint.iacr.org/2013/879.pdf, 37 pages.

(56) References Cited

OTHER PUBLICATIONS

Ben-Sasson et al., "Zerocash: Decentralized Anonymous Payments from Bitcoin," 2014 IEEE Symposium on Security and Privacy, May 18, 2014, http://zerocash-project.org/media/pdf/zerocash-oakland2014.pdf, 16 pages.
Bitcoinstrings, "Blockchain in Words," retrieved from https://bitcoinstrings.com/blk00281.txt, Dec. 2013, 667 pages.
Bowe, "Pay-to-Sudoku," GitHub, retrieved from https://github.com/zcash-hackworks/pay-to-sudoku/blob/master/README.md, 2016, 2 pages.
Brown et al., "Transport layer security (tls) evidence extensions," Working Draft, IETF Secretariat, Internet-Draft drafthousley-evidence-extns-01, https://tools.ietf.org/pdf/draft-housley-evidence-extns-01, Nov. 2006 [retrieved May 2, 2018], 21 pages.
Buterin, "Quadratic Arithmetric Programs: from Zero to Hero," retrieved from https://medium.com/@VitalikButerin/quadratic-arithmetic-programs-from-zero-to-hero-f6d558cea649, Dec. 11, 2016, 9 pages.
Campanelli et al., "Zero-knowledge contingent payments revisited: Attacks and payments for services," Proceedings of the 2017 ACM SIGSAC Conference on Computer and Communications Security, Oct. 30, 2017, 28 pages.
Canetti et al., "Practical Delegation of Computation Using Multiple Servers," CCS, Oct. 17, 2011, 10 pages.
Castor, "Trust Your Oracle? Cornell Launches Tool for Confidential Blockchain Queries," CoinDesk, retrieved from https://www.coindesk.com/tech/2017/05/17/trust-your-oracle-cornell-launches-tool-for-confidential-blockchain-queries/, May 17, 2017, 5 pages.
Commercial Search Report dated Feb. 28, 2018, United Kingdom Patent Application No. 1719998.5, filed Nov. 30, 2017, 6 pages.
Costello et al., "Geppetto: versatile Verifiable Computation," 2015 IEEE Symposium on Security and Privacy, 2015, 22 pages.
Covaci et al., "Computer-implemented system and method," United Kingdom Patent Application No. 1720946.1, filed Dec. 15, 2017.
Covaci et al., "Extracting Information from the CRS in a ZK Protocol on Blockchain," United Kingdom Patent Application No. 1719998.5, filed Nov. 30, 2017.
Covaci et al., "Logic Minimisation of C-like Smart Contracts for Optimised Verifiable Computation," United Kingdom Patent Application No. 1718505.9, filed Nov. 9, 2017.
Covaci et al., "NECTAR: Non-Interactive Smart Contract Protocol using Blockchain Technology," arXiv preprint arXiv:1803 04860, Mar. 13, 2018, 8 pages.
Davidsen et al., "Empowering the Economy of Things," 2017, 54 pages.
Eberhardt et al., "ZoKrates—Scalable Privacy-Preserving Off-Chain Computations," Information Systems Engineering (ISE), Aug. 2018, 8 pages.
Ethereum Foundation, "ZoKrates—A Toolbox for zkSNARKS on Ethereum," https://www.youtube.com/watch?v=sSlrywb5J_0, Nov. 26, 2017, 12 pages.
Fee et al., "Cryptography using Chebyshev polynomials," Maple Summer Workshop, Burnaby, Canada, Jul. 11, 2004, http://www.cecm.sfu.ca/CAG/ppaers/CHEB, 16 pages.
Fiore et al., "Hash First, Argue Later Adaptive Verifiable Computations on Outsourced Data, ACM Computer and Communications Security, 2016, 40 pages.
Fournet et al., "A Certified Compiler for Verifiable Computing," HAL Open Science, Jun. 2016, 14 pages.
Franz et al., "CBMC-GC: An ANSI C Compiler for Secure Two-Party Computations," retrieved from https://arise.or.at/pubpdf/CBMC-GC_An_ANSI_C_Compiler_for_Secure_Two-Party_Computations.pdf, 2014, 5 pages.
Fuchsbauer et al., "Proofs on Encrypted Values in Bilinear Groups and an Applicaiton to Anonymity of Signatures," Third International Conference on Pairing-based Cryptography, Aug. 2009, 26 pages.
Gennaro et al., "Quadratic Span Programs and Succint NIZKs without PCPs," Annual International Conference on the Theory and Applications of Cryptographic Techniques, May 26, 2013, 20 pages.

Gennaro et al., "Robust Threshold DSS Signatures," International Conference on the Theory and Applications of Cryptographic Techniques, May 12, 1996, https://link.springer.com/content/pdf/10.1007%2F3-540-68339-9_31.pdf, 18 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
Hajjeh et al., "TLS Sign," TLS Working Group, Internet Draft Version 4, Dec. 15, 2007 [retrieved May 2, 2018], https://tools.ietf.org/html/draft-hajjeh-tls-sign-04, 12 pages.
Hearn, "Continuing the zkSNARK Tutorials," retrieved from https://blog.plan99.net/vntinyram-7b9d5b299097, Dec. 15, 2016, 9 pages.
Hong et al., "Verifiable Computation of Large Polynomials," retrieved from http://or.nsfc.gov.cn/bitstream/00001903-5/154735/1/1000009080185.pdf, Dec. 16, 2014, 13 pages.
International Search Report and Written Opinion dated Jan. 15, 2019, Patent Application No. PCT/IB2018/058434, 11 pages.
International Search Report and Written Opinion dated Jan. 17, 2019, Patent Application No. PCT/IB2018/058437, 10 pages.
International Search Report and Written Opinion dated Jan. 22, 2019, Patent Application No. PCT/IB2018/058583, 10 pages.
International Search Report and Written Opinion dated Jan. 23, 2019, Patent Application No. PCT/IB2018/058433, 12 pages.
International Search Report and Written Opinion dated Jan. 23, 2019, Patent Application No. PCT/IB2018/058491, 12 pages.
International Search Report and Written Opinion dated Mar. 14, 2019, Patent Application No. PCT/IB2018/059770, 12 pages.
International Search Report and Written Opinion dated Mar. 19, 2019, Patent Application No. PCT/IB2018/059918, 14 pages.
Jehan, "Rockchain Decentralized Audited Data Networks," White Paper, retrieved from https://www.rockchain.org/RockchainWhitePaper.pdf, Jan. 20, 2018, 28 pages.
Kerber, "Verifiable Computation in Smart Contracts," University of Edinburgh School of Informatics Computer Science 4th Year Project Report, published online Apr. 4, 2017 [retrieved May 2, 2018], https://git.drwx.org/bsc/proj-report/raw/branch/master/report.pdf, 49 pages.
Kiayias et al., "Proofs of Proofs of Work with Sublinear Complexity," Financial Cryptography and Data Security, 2016, 18 pages.
Kosba et al., "Hawk: The Blockchain Model of Cryptography and Privacy-Preserving Smart Contracts," IEEE Symposium on Security and Privacy, May 22, 2016, 31 pages.
Kreuter, "Techniques for Scalable Secure Computation Systems," retrieved from https://repository.library.northeastern.edu/files/neu:cj82rh04k/fulltext.pdf, May 2018, 145 pages.
Król et al., "SPOC: Secure Payments for Outsourced Computations," Jul. 17, 2018, 6 pages.
Kumaresan et al., "How to Use Bitcoin to Incentivize Correct Computations," retrieved from https://people.csail.mit.edu/ranjit/papers/incentives.pdf, Nov. 2014, 12 pages.
Malkhi et al., "Fairplay—A Secure Two-Party Computation System," Aug. 2004, 17 pages.
Mathworks, "Matlab Coder—Generate C and C++ Code From MATLAB Code," 9 pages.
Maxwell et al., "Chat logs," Bitcoin-wizards IRC Chat Channel, Aug. 16, 2013 [retrieved May 2, 2018], https://download.wpsoftware.net/bitcoin/wizards/2013/08/13-08-16.log, 1 page.
Maxwell et al., "CoinCovenants using SCIP signatures, an amusingly bad idea," Bitcoin Forum, Aug. 20, 2013 [retrieved Apr. 13, 2018], https://bitcointalk.org/index.php?topic=278122.0, 5 pages.
Turner, "CSE 260. Introduction to Digital Logic and Computer Design," Syllabus and Text Book, https://www.arl.wustl.edu/-jst/cse/260/ddc.pdf, 2015, 435 pages.
Maxwell et al., "Really Really ultimate blockchain compression: CoinWitness," Bitcoin Forum, Aug. 19, 2013 [retrieved Apr. 11, 2018], https://bitcointalk.org/index.php?topic=277389.0, 7 pages.
Maxwell, "The First Successful Zero-Knowledge Contingent Payment," Bitcoin Core, retrieved from https://bitcoincore.org/en/2016/02/26/zero-knowledge-contingent-payments-announcement/, Feb. 26, 2016, 5 pages.
Mayer, "zk-SNARK Explained: Basic Principles," Dec. 13, 2016, 9 pages.

(56) References Cited

OTHER PUBLICATIONS

Mayer, "zk-SNARK explained: Basic Principles," retrieved from https://www.researchgate.net/publication/321124635_zk-SNARK_explained_Basic_Principles, Dec. 2016, 9 pages.
Müller, "A Short Note on Secret Sharing Using Elliptic Curves," Proceedings of SECRYPT 2008, Jul. 26, 2008, http://www.scitepress.org/Papers/2008/19183/19183.pdf, 4 pages.
Nakamoto, "Bitcoin: A Peer-to-Peer Electronic Cash System," Bitcoin, Oct. 31, 2008, https://bitcoin.org/bitcoin.pdf, 9 pages.
Ning, "Automatically Convert MATLAB Code to C Code," https://www.mathworks.com/videos/automatically-converting-matlab-code-to-c-code-96483.html, Aug. 19, 2014, 8 pages.
Parno et al., "Pinocchio: Nearly Practical Verifiable Computation," IEEE Symposium on Security and Privacy, May 19-22, 2013, 16 pages.
Parno, "A Note on the Unsoundness of vnTinyRAM's SNARK," retrieved from https://eprint.iacr.org/2015/437, May 6, 2015, 4 pages.
Prasad et al., "Effect pf Quine-McCluskey Simplification on Boolean Space Complexity," IEEE Xplore, Jul. 25-26, 2009, 6 pages.
Ritzdorf et al., "TLS-N: Non-repudiation over TLS Enabling Ubiquitous Content Signing for Disintermediation," IACR ePrint report, first disclosed 2017 [retrieved May 2, 2018], 16 pages.
Satoshi et al., "Connection Limits," Bitcoin Forum, Aug. 9, 2010, https://bitcointalk.org/index.php?topic=741.0;prev_next=prev, 2 pages.
Schaeffer et al., "ZoKrates—a Toolbox for zkSNARKS on Ethereum," https://github.com/Zokrates/ZoKrates, Feb. 4, 2019, 3 pages.
Schoenmakers et al., "Trinocchio: Privacy-Preserving Outsourcing by Distributed Verifiable Computation," International Conference on Applied Cryptography and Network Security, Jun. 19, 2016, https://eprint.iacr.org/2015/480.pdf, 33 pages.
Stuart, "EECS Presents Awards for Outstanding PhD and SM Theses," EECS, Nov. 8, 2017, 2 pages.
Sward et al. "Data Insertion in Bitcoin's Blockchain" [online] Augustana College, Jul. 2017 [retrieved Feb. 10, 2022]. Retrieved from the Internet: URL: https://digitalcommons.augustana.edu/cgi/viewcontent.cgi?article=1000&context=cscfaculty 2017, 19 pages.
Teutsch et al., "A scalable verification solution for blockchains," Nov. 16, 2017, https://people.cs.uchicago.edu/~teutsch/papers/truebit.pdf, 50 pages.
Tillich et al., "Circuits of basic functions suitable for MPC and FHE," https://homes.esat.kuleuven.be/~nsmart/MPC/, first disclosed 2012, retrieved May 2, 2018, 2 pages.
Todd, "[bitcoin-dev] Building Blocks of the State Machine Approach to Consensus," petertodd.org, Jun. 20, 2016, https://lists.linuxfoundation.org/pipermail/bitcoin-dev/2016-June/012773.html, six pages.
Turner, "Designing Digital Circuits a modern approach," CSE 260, Introduction to Digital Logic and Computer Design, Spring 2014, 435 pages.
UK Commercial Search Report dated Dec. 3, 2018, Patent Application No. GB1806444.4, 8 pages.
UK Commercial Search Report dated Feb. 2, 2018, Patent Application No. GB 1718505.9, 7 pages.
UK Commercial Search Report dated May 31, 2018, Patent Application No. GB1801753.3, 8 pages.
UK Commercial Search Report dated Oct. 25, 2018, Patent Application No. GB1805948.5, 9 pages.
UK IPO Search Report dated Jul. 26, 2018, Patent Application No. GB1801753.3, 5 pages.
UK IPO Search Report dated Nov. 2, 2018, Patent Application No. GB1805948.5, 4 pages.
UK IPO Search Report dated Nov. 8, 2018, Patent Application No. GB1806444.4, 6 pages.
United Kingdom Commercial Search Report dated Apr. 20, 2018, Patent Application No. 1720768.9, filed Dec. 13, 2017, 8 pages.
United Kingdom Intellectual Property Office Search Report dated Jun. 12, 2018, Patent Application No. 1720768.9, filed Dec. 13, 2017, 7 pages.
United Kingdom Intellectual Property Office Search Report dated May 3, 2018, Patent Application No. 1719998.5, filed Nov. 30, 2017, 6 pages.
United Kingdom IPO Search Report dated Apr. 27, 2018, Patent Application No. 1718505.9, filed Nov. 9, 2017, 5 pages.
Viacoin Dev Team, "Styx: Unlinkable Anonymous Atomic Payment Hub for Viacoin," viacoin.org, Oct. 14, 2016, http://docplayer.net/35213119-Styx-unlinkable-anonymous-atomic-payment-hub-for-viacoin-viacoin-dev-team-viacoin-org.html, 18 pages.
Virza, "On Deploying Succinct Zero-Knowledge Proofs" [online] MIT, Sep. 2017 [retrieved Feb. 10, 2022]. Retrieved from the Internet: URL: On Deploying Succinct Zero-Knowledge Proofs, 2016, 131 pages.
Wikipedia, "Precompiled Header," Retrieved Mar. 30, 2022, https://en.wikipedia.org/w/index.php?title=Precompiled_header&oldid=807155683, 3 pages.
Wikipedia, "Zero Knowledge Contingent Payment," Bitcoin Wiki, retrieved from https://en.bitcoin.it/wiki/Zero_Knowledge_Contingent_Payment, Apr. 8, 2020, 3 pages.
Wu et al., "Libsnark: a C++ Library for zkSNARK Proofs," SCIPR Lab, libsnark/README.md at 92a80f74727091fdc40e6021dc42e9f6b67d5176, Aug. 18, 2017, 9 pages.
ZCash, "zk-SNARKs," zCash website, retreived Apr. 1, 2022 from https://web.archive.org/web/20171107012237/https://z.cash/technology/zksnarks.html, Nov. 24, 2017, 1 page.
Kuzminov et al., "Bridging the Gaps with Iolite Blockchain," Iolite Foundation White Paper, 2017, 13 pages.
Keutzer et al., "Anatomy of a Hardware Compiler," 1988, 10 pages.
International Search Report and Written Opinion dated Jan. 17, 2019, Patent Application No. PCT/IB2018/058432, 11 pages.

* cited by examiner

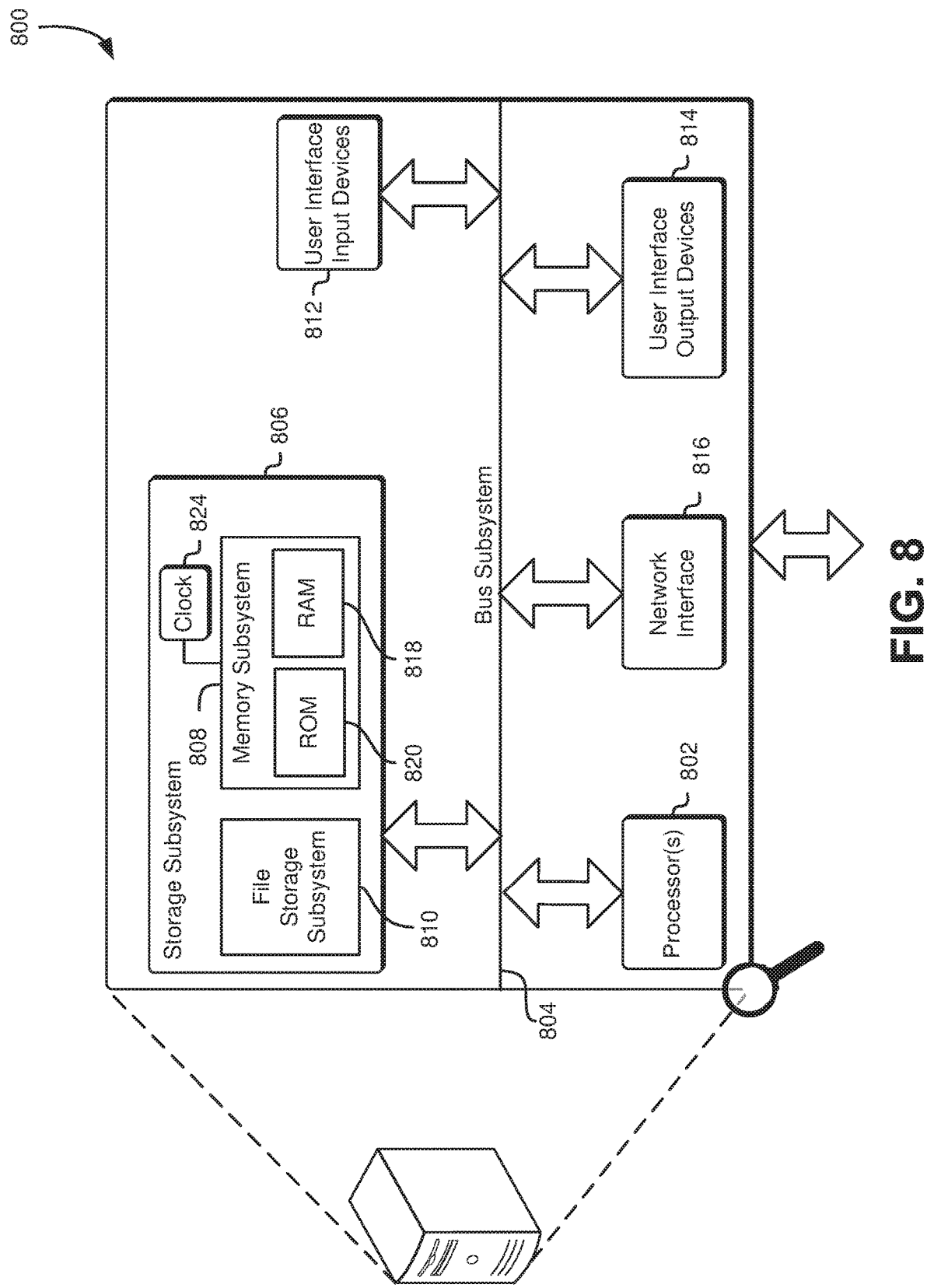

1

SYSTEM FOR SECURING VERIFICATION KEY FROM ALTERATION AND VERIFYING VALIDITY OF A PROOF OF CORRECTNESS

FIELD OF INVENTION

This invention relates generally to blockchain technologies, and more particularly to enabling execution of a zero-knowledge protocol on a blockchain by utilizing a locking script to secure a verification key from alteration and verify the validity of a proof of correctness. This invention further utilises cryptographic and mathematical techniques to enforce security in relation to electronic transfers conducted over a blockchain network. The invention is particularly suited, but not limited to, use in smart contract generation and execution.

BACKGROUND OF INVENTION

In this document, the term 'blockchain' may refer to any of several types of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to as a useful application of the technology described in the present disclosure, for the purpose of convenience and illustration, Bitcoin is just one of many applications to which the technology described in the present disclosure may be applied. However, it should be noted that the invention is not limited to use with the Bitcoin blockchain; alternative blockchain implementations and protocols, including non-commercial applications, also fall within the scope of the present invention.

A blockchain is a peer-to-peer, electronic ledger which is implemented as a computer-based decentralised, distributed system made up of blocks which in turn may be made up of transactions and other information. In some examples, a "blockchain transaction" refers to an input message encoding a structured collection of field values comprising data and a set of conditions, where fulfillment of the set of conditions is prerequisite for the set of fields to be written to a blockchain data structure. For example, with Bitcoin each transaction is a data structure that encodes the transfer of control of a digital asset between participants in the blockchain system, and includes at least one input and at least one output. In some embodiments, a "digital asset" refers to binary data that is associated with a right to use. Examples of digital assets include Bitcoin, ether, and Litecoins. In some implementations, transferring control of a digital asset can be performed by reassociating at least a portion of a digital asset from a first entity to a second entity. Each block of the blockchain may contain a hash of the previous block to that blocks become chained together to create a permanent, unalterable record of all transactions which have been written to the blockchain since its inception.

In some examples, "stack-based scripting language" refers to a programming language that supports various stack-based or stack-oriented execution models and operations. That is, the stack-based scripting language may utilize a stack. With the stack, values can be pushed onto the top of the stack or popped from the top of the stack. Various operations performed to the stack can result in pushing or popping one or more of the values to or from the top of the stack. For example, an OP_EQUAL operation pops the top two items from the stack, compares them, and pushes a result (e.g., 1 if equal or 0 if unequal) to the top of the stack. Other operations performed to the stack, such as OP_PICK, may allow items to be selected from positions other than the top of the stack. In some scripting languages employed by some of the present embodiments, there may be at least two stacks:

a main stack and an alternate stack. Some operations of the scripting language can move items from the top of one stack to the top of another stack. For example, OP_TOALTSTACK, moves a value from the top of the main stack to the top of the alternate stack. It should be noted that a stack-based scripting language, in some cases, may not be limited solely to operation in a strictly last-in-first-out (LIFO) manner. For example, a stack-based scripting language may support operations that copies or moves the n-th item in the stack to the top (e.g., OP_PICK and OP_ROLL respectively, in Bitcoin). Scripts written in a stack-based scripting language may be pushed onto a logical stack that can be implemented using any suitable data structure such as a vector, list, or stack.

In order for a transaction to be written to the blockchain, it must be "validated". Network nodes (mining nodes) perform work to ensure that each transaction is valid, with invalid transactions rejected from the network. A node can have standards for validity different from other nodes. Because validity in the blockchain is consensus based, a transaction is considered valid if a majority of nodes agree that a transaction is valid. Software clients installed on the nodes perform this validation work on transactions referencing an UTXO in part by executing the UTXO locking and unlocking scripts. If execution of the locking and unlocking scripts evaluates to TRUE and other validation conditions, if applicable, are met, the transaction is validated by the node. The validated transaction is propagated to other network nodes, whereupon a mining node can select to include the transaction in a blockchain. Thus, in order for a transaction to be written to the blockchain, it must be i) validated by the first node that receives the transaction—if the transaction is validated, the node relays it to the other nodes in the network; and ii) added to a new block built by a mining node; and iii) mined, i.e., added to the public ledger of past transactions. The transaction is considered to be confirmed when a sufficient number of blocks is added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc.) while being more versatile in their applications.

The present disclosure describes technical aspects of one or more blockchain-based computer programs. A blockchain-based computer program may be a machine readable and executable program recorded in a blockchain transaction. The blockchain-based computer program may comprise rules that can process inputs in order to produce results, which can then cause actions to be performed dependent upon those results. One area of current research is the use of blockchain-based computer programs for the implementation of "smart contracts". Unlike a traditional contract which would be written in natural language, smart contracts may be computer programs designed to automate the execution of the terms of a machine-readable contract or agreement.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

In embodiments, although interaction with specific entities can be encoded at specific steps in the smart contract, the smart contract can otherwise be automatically executed and self-enforced. It is machine readable and executable. In some examples, automatic execution refers to the execution of the smart contract that is successfully performed to enable transfer of the UTXO. Note that in such examples, "an entity" that is able to cause the transfer of the UTXO refers to an entity that is able to create the unlocking script without being required to prove knowledge of some secret. In other words, the unlocking transaction can be validated without verifying that the source of the data (e.g., an entity that created the unlocking transaction) has access to a cryptographic secret (e.g., private asymmetric key, symmetric key, etc.). Also, in such examples, self-enforcement refers to the validation nodes of the blockchain network being caused to enforce the unlocking transaction according to the constraints. In some examples, "unlocking" a UTXO (also known as "spending the UTXO) is used in the technical sense, referring to creating an unlocking transaction that references the UTXO and executes as valid.

A blockchain transaction output includes a locking script and information regarding ownership of digital assets such as Bitcoins. The locking script, which may also be referred to as an encumbrance, "locks" the digital assets by specifying conditions that are required to be met in order to transfer the UTXO. For example, a locking script could require that certain data be provided in an unlocking script to unlock the associated digital assets. The locking script is also known as "scriptPubKey" in Bitcoin. A technique for requiring a party to provide data to unlock a digital asset involves embedding a hash of the data inside the locking script.

SUMMARY OF INVENTION

Thus, it is desirable to provide methods and systems that improve blockchain technology in one or more of these aspects. Such an improved solution has now been devised. Thus, in accordance with the present invention there is provided a method as defined in the appended claims.

Such an improved solution has now been devised.

Thus, in accordance with the present invention there are provided systems and methods as defined in the appended claims.

In accordance with the invention there may be provided a computer-implemented method for a node of a blockchain network, the computer-implemented method comprising: generating a transaction output of a transaction comprising an indication of a digital asset and a locking script that encodes a set of conditions for transferring control of the digital asset, satisfaction of the set of conditions to be determined based at least in part on a verification key and a proof; generating a transaction input of the transaction, the transaction input comprising: an identifier associated with the transaction output; and an unlocking script comprising the proof; and verifying the set of conditions are satisfied based at least in part on the locking script and the unlocking script; and transferring control of the digital asset in response to verifying satisfaction of the set of conditions.

The verification key may comprises a first plurality of elements of a finite field and the proof comprises a second plurality of elements of the finite field.

The elements of the field may be points on an elliptic curve.

The elements of the finite field may be encoded in a compressed format.

Preferably, the method may include a client encoding the transaction input with the verification key and a first digital certificate associated with the client and a worker encoding the transaction input with the proof and a second digital certificate associated with the worker.

The locking script may comprise instructions that, contingent upon a condition of the set of conditions being unsatisfied by the unlocking script, reclaim the digital asset for the provider of the digital asset.

The locking script may further comprise a redeem script, wherein the verification key and the redeem script encodes sufficient information to determine satisfaction of the at least subset of the set of conditions; and the locking script encodes, as one condition the set of conditions, that a hash of the redeem script matches a predetermined value.

The redeem script may be less than or equal to a predetermined maximum size, such as 520 bytes.

The unlocking script may comprise one or more elements of the verification key, and the redeem script may comprise at least some of the remaining elements of the verification. The unlocking script and the redeem script may collectively comprise the verification key.

The locking script, unlocking script, and redeem script of the transaction may be in accordance with a Pay-to-Script-Hash transaction of a Bitcoin-based protocol or variations thereof.

The transaction may be in accordance with a standard transaction of a blockchain-based protocol such as a Bitcoin protocol.

The scripts, such as the locking script and the unlocking script, may be encoded with commands and data in a stack-based scripting language, wherein the commands and the data are placed on a stack in a last-in-first-out order.

The set of conditions may comprise one or more bilinear constraints.

It is also desirable to provide a system, comprising: a processor; and memory including executable instructions that, as a result of execution by the processor, causes the system to perform any of the methods as claimed.

It is also desirable to provide a non-transitory computer-readable storage medium having stored thereon executable instructions that, as a result of execution by one or more processors of a computer system, cause the computer system to at least perform any of the methods as claimed.

The invention can be described as a verification method/system, and/or as a control method/system for controlling the exchange or transfer of a digital asset via a blockchain. In some embodiments, the digital asset is a token or a portion of cryptocurrency. As explained below, the invention can also be described as a secure method/system for new, improved and advantageous ways of performing operations via a blockchain network or platform.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which:

FIG. 8 illustrates a computing device that can be used to practice at least one embodiment of the present disclosure.

DETAILED DESCRIPTION

Figure 1:
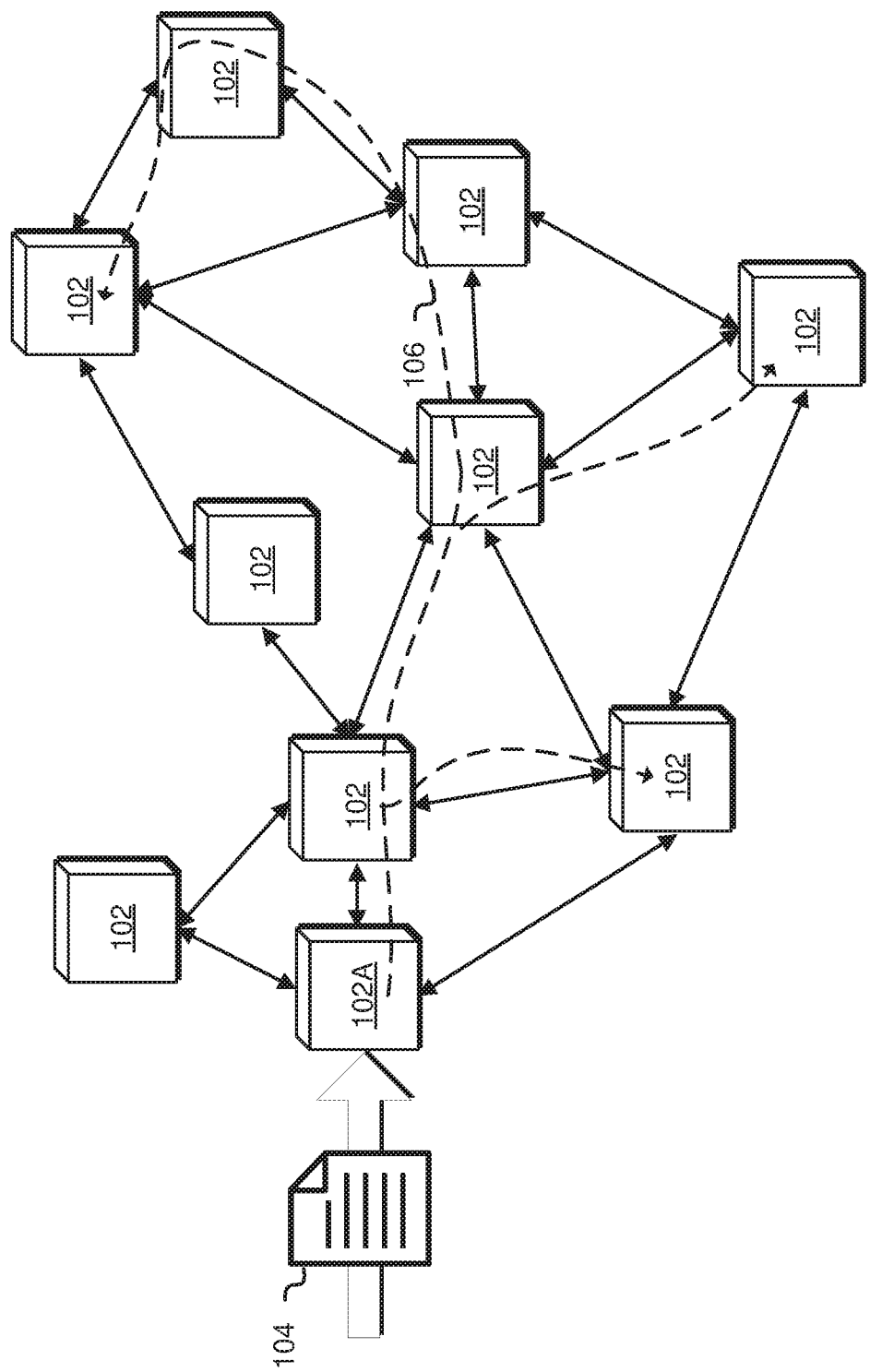
FIG. 1 illustrates a blockchain environment in which various embodiments can be implemented.

Reference will first be made to FIG. 1, which illustrates an example blockchain network 100 associated with a blockchain in accordance with an embodiment of the present disclosure. In the embodiment, the example blockchain network 100 comprises blockchain nodes that are implemented as peer-to-peer distributed electronic devices, each running an instance of software and/or hardware that performs operations that follow a blockchain protocol that is, at least in part, agreed to among operators of nodes 102. In some examples, "nodes" refers to peer-to-peer electronic devices that are distributed among the blockchain network. An example of a blockchain protocol is the Bitcoin protocol.

In some embodiments, the nodes 102 can be comprised of any suitable computing device (e.g., by a server in a data centre, by a client computing device (e.g., a desktop computer, laptop computer, tablet computer, smartphone, etc.), by multiple computing devices in a distributed system of a computing resource service provider, or by any suitable electronic client device such as the computing device 800 of FIG. 8). In some embodiments, the nodes 102 have inputs to receive data messages or objects representative of proposed transactions, such as a transaction 104. The nodes, in some embodiments, are be queryable for information they maintain, such as for information of a state of the transaction 104.

As shown in FIG. 1, some of the nodes 102 are communicatively coupled to one or more other of the nodes 102. Such communicative coupling can include one or more of wired or wireless communication. In the embodiment, the nodes 102 each maintain at least a portion of a "ledger" of all transactions in the blockchain. In this manner, the ledger would be a distributed ledger. A transaction processed by a node that affects the ledger is verifiable by one or more of the other nodes such that the integrity of the ledger is maintained.

As for which nodes 102 can communicate with which other nodes, it can be sufficient that each of the nodes in the example blockchain network 100 are able to communicate with one or more other of the nodes 102 such that a message that is passed between nodes can propagate throughout the example blockchain network 100 (or some significant portion of it), assuming that the message is one that the blockchain protocol indicates should be forwarded. One such message might be the publication of a proposed transaction by one of the nodes 102, such as node 102A, which would then propagate along a path such as a path 106. Another such message might be the publication of a new block proposed for inclusion onto a blockchain.

In an embodiment, at least some of the nodes 102 are mining nodes that perform complex calculations, such as solving cryptographic problems. A mining node that solves the cryptographic problem creates a new block for the blockchain and broadcasts the new block to others of the nodes 102. The others of the nodes 102 verify the work of the mining node and, upon verification, accept the block into the blockchain (e.g., by adding it to the distributed ledger of the blockchain). In some examples, a block is a group of transactions, often marked with a timestamp and a "fingerprint" (e.g., a hash) of the previous block. In this manner, each block may become linked to a previous block, thereby creating the "chain" that links the blocks in the blockchain. In embodiments, valid blocks are added to the blockchain by a consensus of the nodes 102. Also in some examples, a blockchain comprises a list of validated blocks.

In an embodiment, at least some of the nodes 102 operate as validating nodes that validate transactions as described in the present disclosure. In some examples, a transaction includes data that provides proof of ownership of a digital asset (e.g., a number of Bitcoins) and conditions for accepting or transferring ownership/control of the digital asset. In some examples, an "unlocking transaction" refers to a blockchain transaction that reassociates (e.g., transferring ownership or control) at least a portion of a digital asset, indicated by an UTXO of a previous transaction, to an entity associated with a blockchain address. In some examples, a "previous transaction" refers to a blockchain transaction that contains the UTXO being referenced by the unlocking transaction. In some embodiments, the transaction includes a "locking script" that encumbers the transaction with conditions that must be fulfilled before ownership/control can be transferred ("unlocked").

In some embodiments, the blockchain address is a string of alphanumeric characters that is associated with an entity to which control of at least a portion of a digital asset is being transferred/reassociated. In some blockchain protocols implemented in some embodiments, there is a one-to-one correspondence between a public key associated with the entity and the blockchain address. In some embodiments, validation of transactions involves validating one or more conditions specified in a locking script and/or unlocking script. Upon successful validation of the transaction 104, the validation node adds the transaction 104 to the blockchain and distributes it to the nodes 102.

Systems and methods described herein relate to enabling a locking script to secure the verification key $V_K$ from alteration and checking validity of a proof $\pi$, thereby allowing execution of a zero-knowledge protocol on a blockchain during transaction validation.

A verifiable computation is a technique that allows the generation of proofs of computation. In an embodiment, such a technique is utilized by a client to outsource, to another computing entity referred to herein as a worker, the evaluation of a function f on an input x. In some cases, the client is computationally limited so that it is infeasible for the client to perform the evaluation of the function (e.g., the expected runtime of the calculation using computing resources available to the client exceeds a maximum acceptable threshold), although such need not be the case, and the client may, generally, speaking, delegate evaluation of the function f on the input x based on any suitable criterion, such as computational runtime, computational cost (e.g., the financial cost of allocating computing resources to perform the evaluation of the function), and more.

A worker, in an embodiment, is any suitable computing entity such as a blockchain node as described in greater detail elsewhere in the present disclosure. In an embodiment, a worker (e.g., a blockchain node) evaluates the function f on input x and generates an output y and a proof π of the correctness of the output y that can be verified by other computing entities such as the client as described above and/or other nodes of the blockchain network. Proofs, which may also be referred to as arguments, can be verified faster than doing the actual computational—accordingly, computational overhead can be reduced (e.g., reducing power overhead and the cost associated with powering and running computing resources) by verifying the correctness of the proof instead of re-computing the function f over input x to determine the correctness of the output generated by the worker described above. In zero-knowledge verifiable computation the worker provides an attestation to the client that the worker knows an input with a particular property.

An efficient variant of a zero-knowledge proof of knowledge is zk_SNARK (Succinct Non-interactive ARgument of Knowledge). In an embodiment, all pairings-based zk-SNARKs include a process where the worker computes a number of group elements using generic group operations and the verifier checks the proof using a number of pairing product equations. in an embodiment, the linear interactive proof works over a finite field and the worker's and verifier's message include, encode, reference, or otherwise include information usable to determine vectors of field elements.

In an embodiment, systems and methods described herein allow mining nodes of a blockchain to perform a computation (e.g., evaluation of function f on input x) once and generate a proof that can be used to verify correctness of the output wherein evaluating correctness of the proof is computationally less expensive than evaluating the function. In this context, the cost (i.e., how expensive) of operations and tasks may refer to the computational complexity of performing the operation or task. In an embodiment, computational complexity refers to the average computational cost or the worst-case computational cost of performing the sorting algorithm—for example, a heapsort algorithm and a quicksort algorithm both have an average computational cost of $O(n \log n)$, but quicksort has a worst-case computational cost of $O(n^2)$ whereas heapsort has a worst-case computation cost of $O(n \log n)$. In an embodiment, the average computational cost and/or the worst-case computational cost of evaluating the function f on input x is worse than that of evaluating correctness of the proof. Accordingly, the use of systems and methods described herein are highly advantageous and, may, for example, allow for more computationally expensive contracts to be run as such contacts would not increase the time required to validate the blockchain proportionally. Further advantages may include reduction in power consumption of verifier systems, thereby improving the efficiency of verifier computer systems and reducing the energy costs associated with running such verifier computer systems in evaluating correctness of proofs. Currently, smart contracts must be executed and validated on all nodes—this constraint limits the complexity of smart contracts. Methods and systems described herein can be utilized to implement a system that improves the efficiency of the blockchain by executing a contract once to generate a proof of correctness and, based on the proof of correctness provided by the worker and the verification key provided by the client, all nodes of the blockchain can verify validity of the contract. In this way, the efficiency of the blockchain is improved by increasing the throughput of smart contracts that can be performed in aggregate by nodes of the blockchain and/or enable the computation of more computationally expensive smart contracts.

In an embodiment, a verification key $V_K$ or portions thereof can be extracted from public parameters generated in a setup phase of a zero-knowledge protocol and used together with a proof π, and the input/output data to verify the alleged proof of correctness computation provided by a worker. For example, as described in greater detail above and below, systems and methods that allow a locking script secures the verification key $V_K$ from alteration and checks the validity of the proof π, allowing the execution of a zero-knowledge protocol on blockchain during transaction validation. Accordingly, the present disclosure presents systems and methods to execute the verification phase using blockchain scripts (e.g., in a Bitcoin-based network) for storing the elements used in the verification of the computation.

Figure 2:
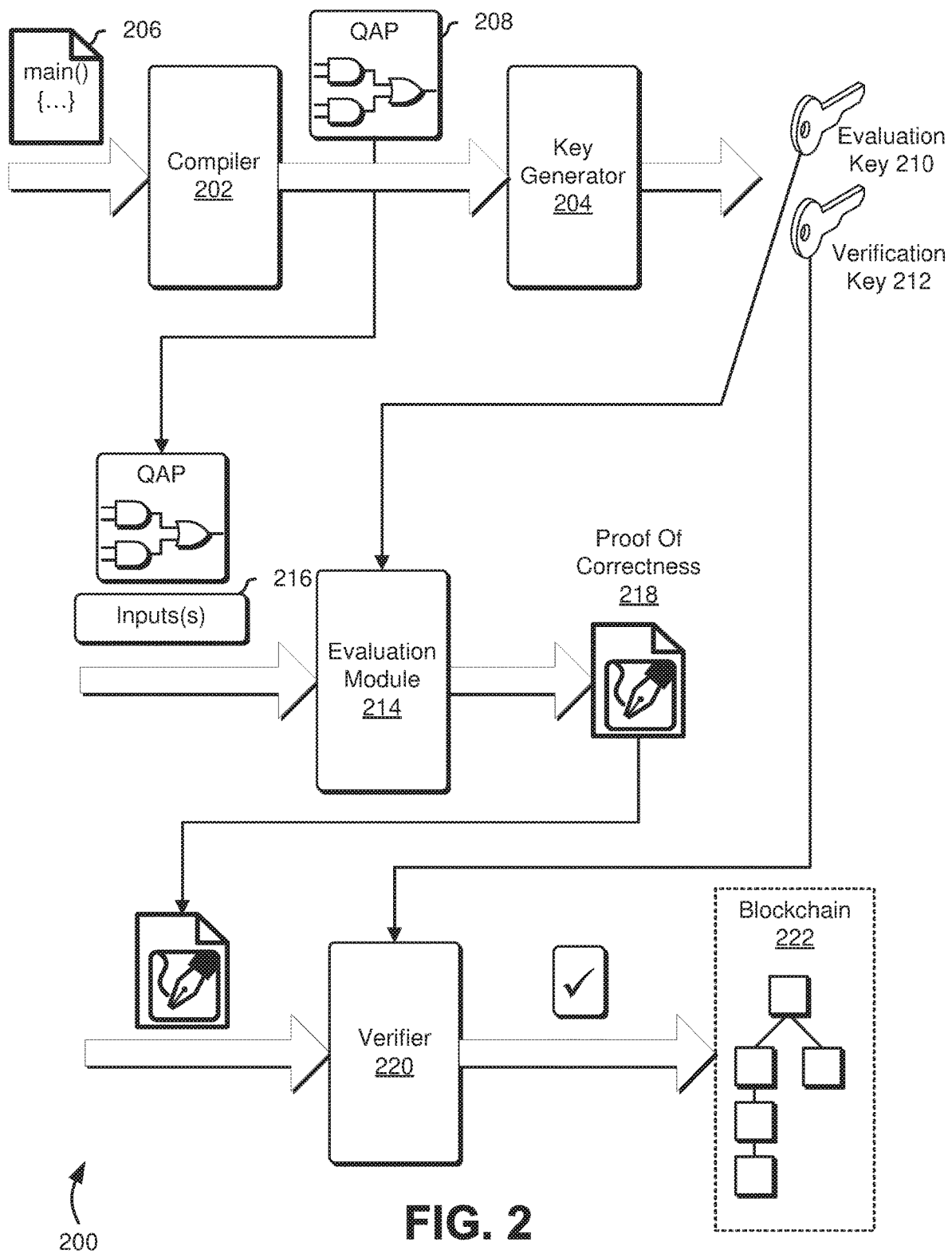
FIG. 2 illustrates a computing environment which may be utilized to implement a protocol in accordance with various embodiments.

FIG. 2 illustrates a computing environment 200 which may be utilized to implement a protocol in accordance with various embodiments. The protocol may be implemented using blockchain technologies to store proof-of-correctness and combine the "correct-by-construction" cryptography approach with smart contracts. In an embodiment, a public verifiable computation scheme comprises three phases: a setup phase, a computation phase and a verification phase.

A setup phase may be performed as part of a process to outsource the performance of computational tasks. A client, as referred to below, may refer to an entity such as a customer or client computer system that delegates performance of a computational task to a worker, which may be a different computer system. Clients may, generally speaking, delegate the performance of computational tasks for a variety of reasons, including but not limited to limited computing resources, lack of computing resources, financial costs associated with utilizing a client computer system to perform the task, energy costs associated with utilizing a client computer system to perform the task (e.g., a mobile device or laptop that relies on a battery for power may utilize a worker to perform computationally intensive tasks, thereby saving power and prolonging the usage of the battery-powered device), and more.

In an embodiment, the setup phase involves a client, customer, employee of an organization, or any other suitable entity writing contracts in a formal language with precise semantics. The contract may be written in a high-level programming language such as C or Java. Generally speaking, contracts may be expressed in any language or syntax that is or can be converted to a format that can be manipulated by a computer system. In an embodiment, a domain specific language, with a limited purpose, may provide type-safety and restricted expressivity may be utilized. The source code generated may be a precise description of a contract.

The compiler 202 may be any hardware, software, or a combination thereof that includes executable code that, if executed by one or more processors of a computer system, causes the system to take, as input, the source code 206 and produces a circuit. A compiler 202 may refer to a computer program that executes or performs instructions based on instructions that have been compiled into a machine-readable format such as binary code. It should be noted that while a compiler 202 is illustrated, interpreters, assemblers, and other suitable software and/or hardware component may be utilized to convert the source code to a circuit. In an embodiment, the circuit is an arithmetic circuit that comprises wires that carry values from a field F and connect to logical and/or arithmetic gates. In an embodiment, the circuit $\mathcal{C}$ is used by the system to generate a quadratic program Q 208 that comprises a set of polynomials that provide a complete description of the original circuit $\mathcal{C}$.

In an embodiment, the compiler 202 is able to recognise a substantial subset of a programming language such as C or Java including but not limited to: pre-processor directives, static initializers, global and local functions, block-scoped variables, arrays, data structures, pointers, function calls, function operators (e.g., functors), conditionals and loops, and arithmetic and bitwise Boolean operators. In an embodiment, the compiler 202 but does not support the entire set of commands in accordance with standards of the programming language (this may, in some cases, be intended to prevent certain types of algorithms from being executed in a smart contract, such as to prohibit recursive algorithms). In an embodiment, the compiler expands expressions of the source code into an arithmetic gate language to produce an arithmetic circuit. Circuit implementations have been contemplated in the past by Campanelli, M., et al. (2017) in "Zero-Knowledge Contingent Payments Revisited: Attacks and Payments for Services" and by Tillich, S. and Smart, B in "Circuits of Basic Functions Suitable For MPC and FHE." The arithmetic circuit may be utilized to build a Quadratic Arithmetic Problem (QAP) by the compiler 202 or any other suitable hardware, software, or combination thereof (e.g., a software module not illustrated in FIG. 2). The quadratic program is compiled into a set of cryptographic routines for the client (e.g., key generation and verification) and the worker (e.g., computation and proof generation) in accordance with an embodiment. In some embodiments, arithmetic circuit optimisation techniques such as those described in U.K. Pat. Application No. 1718505.9 may be utilized in order to reduce the required resources necessary for a worker to determine an outcome of the smart contract.

In an embodiment, the key generator 204 is hardware, software, or a combination thereof that includes executable code which, if executed by one or more processors of a computer system, causes the system to generate an evaluation key and a verification key form a quadratic program. Techniques for encoding computations as quadratic programs are contemplated in "Quadratic Span Programs and Succinct NIZKs without PCPs" by Gennaro, R., et al. (2013). In an embodiment, the quadratic arithmetic problem (QAP) Q encodes the circuit $\mathcal{C}$ over a field F and contains a set of m+1 polynomials:

$$V=\{v_k(x)\}, W=\{w_k(x)\}, Y=\{y_k(x)\}$$

with $0 \leq k \leq m$. A target polynomial t(x) is also defined. Given a function $f$ that takes n elements of F as input and outputs n' elements, with N=n+n', then Q computes $f$ if $\{c_1, \ldots, c_N\} \in F^N$ is a valid assignment of the group of input and outputs of $f$ and if there exists a list of coefficients $\{c_{N+1}, \ldots, c_m\}$ such that t(x) divides p(x):

$$p(x) = \left(v_0(x) + \sum_{k=1}^{m} c_k \cdot v_k(x)\right) \cdot \left(w_0(x) + \sum_{k=1}^{m} c_k \cdot w_k(x)\right) - \left(y_0(x) + \sum_{k=1}^{m} c_k \cdot y_k(x)\right)$$

Therefore, in an embodiment, there must exist some polynomial h(x) such that $h(x) \cdot t(x) = p(x)$. The size of Q is m, and its degree is the degree of t(x).

In an embodiment, building a QAP for an arithmetic circuit comprises pick an arbitrary root $r_g \in F$ for each multiplication gate g in the circuit and defining the target polynomial to be $t(x) = \Pi_g (x - r_g)$. In an embodiment, an index $k \in \{1 \ldots m\}$ is associated to each input of the circuit and to each output from a multiplication gate. The polynomials in V encode the left input into each gate, the W encode the right input into each gate, and the Y encode the outputs. For instance, $v_k(r_g) = 1$ if the k-th wire is a left input to gate g, and $v_k(r_g) = 0$ otherwise. Therefore, for a particular gate g and its root $r_g$, the previous Equation can be simplified as follows:

$$(\Sigma_{k=1}^{m} c_k \cdot v_k(r_g)) \cdot (\Sigma_{k=1}^{m} c_k \cdot w_k(r_g)) = (\Sigma_{k \in I_{left}} c_k) \cdot (\Sigma_{k \in I_{right}} c_k) = c_g y_k(r_g) = c_g$$

The output value of the gate is equal to the product of its inputs. The divisibility check decomposes into deg(t(x)) separate checks, one for each gate g and root $r_g$ of t(x), such that $p(r_g) = 0$. Addition gates and multiplication-by-constant gates do not contribute to the size or degree of the QAP.

In an embodiment, the QAP is defined over a field Fp, where p is a large prime. In an embodiment, it is desirable that QAP over Fp efficiently computes any function that can be expressed in terms of addition and multiplication modulo p. An arithmetic split gate may be designed to translate an arithmetic wire $a \in Fp$, known to be in $[0, 2^{k-1}]$, into k binary output wires. Accordingly, it follows that, Boolean functions can be expressed using arithmetic gates. For instance, NAND(a,b)=1−ab. Each embedded Boolean gate costs only one multiply. Moreover, new gates such as split can be defined as standalone and composed with other gates. Given input $a \in F_p$ known to be in $[0, 2^{k-1}]$, the split gate outputs k wires holding the binary digits $a_1, \ldots, a_k$ of a such $\Sigma^k 2^{i-1} a_i = a$ and each $a_i$ is either 0 or 1.

Finally, the public parameters to be used by all provers and verifiers are generated by the system as part of the setup phase. It should be noted that the evaluation key $E_K$ and the verification key $V_K$ are derived using a secret value selected by the client. A key generator 204 may utilize the quadratic arithmetic program (QAP) in connection with the key generation algorithm to generate the evaluation key $E_K$ 210 and the verification key $V_K$ 212.

In an embodiment, performing a computational task involves the computation of a function on an input 216 (i.e., a process for evaluating f(x)) by a worker. In an embodiment, the worker is any suitable computer system that the client may delegate a computational task to. The input 216, in an embodiment, includes information that attests to the worker's identity, such as a digital signature generated using a private key associated with the worker. In an embodiment, the worker is a computer system that the client pays a fee for a successful computation (e.g., via a transfer of digital assets). The client, in an embodiment provides an input x and the evaluation key $E_K$ to a worker, the worker uses the evaluation module 214 to a compute routine to compute the output y (i.e., y=f(x) wherein the input is x and the function is f) and uses the evaluation key $E_K$ 210 to produce a proof-of-correctness 218. The evaluation module, in an embodiment, is hardware and/or software that includes instructions that, if executed by one or more processors of a computer system, cause the computer system to evaluate the values of the internal circuit wires of the QAP 208 and produce an output y of the QAP.

In an embodiment, each polynomial $v_k(x) \in F$ of the quadratic program is mapped to an element $g^{v_k(s)}$ in a bilinear group, where s is a secret value selected by the client, g is a generator of the group, and F is the field of discrete logarithms of g. In an embodiment, for a given input, the worker evaluates the circuit to obtain the output and the values of the internal circuit wires, which correspond to the coefficients $c_i$ of the quadratic program. Accordingly, a worker can evaluate $v(s)=\Sigma_{k \in \{m\}} c_k \cdot v_k(S)$ to get $g^{v(s)}$; compute w(s) and y(s); compute $h(x)=p(x)/t(x)=\Sigma^d h_i \cdot x^i$; and compute $g^{h(s)}$ using the $h_i$ and $g^{s(i)}$ terms in the evaluation key. In an embodiment, the proof-of-correctness 218 comprises $(g^{v(s)}, g^{w(s)}, g^{y(s)}, g^{h(s)})$ and a verifier uses the bilinear map to check that $p(s)=h(s) \cdot t(s)$. In an embodiment, the proof π is stored on the blockchain 222 for later use or can be verified by multiple parties without requiring the prover to separately interact with each of these. In an embodiment, the evaluation of the circuit storage of the proof-of-correctness may be performed to unlock digital assets encumbered by a locking script of a transaction.

In an embodiment, the proof π is broadcast to a blockchain network and a verifier 220 is used to verify the proof. In an embodiment, the verifier 220 is any suitable computing entity, such as a node on a blockchain. It should further be noted that in some cases, the same computing entity that generates the evaluation key $E_K$ and verification key $V_K$ also verifies the proof. In an embodiment, nodes of blockchain can validate a payment transaction using the verification key $V_K$ and the proof π, thus validating the contract if the verification succeeds. One requirement of the protocol is that the worker cannot provide incorrect proofs, even when it knows the verification key $V_K$. Thus, in this protocol, a common reference string (CRS) is produced by the client or by a trusted third party who publishes at least the evaluation key $E_K$ and verification key $V_K$. In an embodiment, the published verification key $V_K$ can be used by any computing entity to verify computations.

Using techniques described herein, a client is able to partially obfuscate transaction data, such as the identity of the recipients of a blockchain transaction. In an embodiment, the unlocking script does not expose the recipient's address and the recipient's public key. However, in some cases, the value of the transaction (e.g., amount of digital assets transferred) may be visible to nodes of the blockchain network. In an embodiment, cryptographic techniques as described above and below are utilized by the client to covert locking scripts into quadratic arithmetic programs and the worker to solve arithmetic programs to generate proofs.

Generally speaking, a client is able to use standard transactions (e.g., standard transactions as defined in a Bitcoin-based blockchain network) such as P2PK and P2PKH to pay a counterparty or worker. For example, in an embodiment, a client converts a P2PK locking script into an arithmetic circuit and broadcasts a payment transaction that includes a puzzle derived from the circuit. A counterparty or worker receives the circuit, provides an appropriate input (e.g., information that attests to the worker's identity such as a shared secret between the client and the worker or a digital signature generated using the worker's private key) and runs the circuit to generate a proof-of-correctness π. In an embodiment, the proof is used to unlock digital assets, and furthermore, it may be the case that information identifying the counterparty or worker (e.g., a public key and/or digital signature associated with the counterparty or worker) is not recorded to the blockchain in an unobfuscated format.

In an embodiment, the verification key and the corresponding proof are generated according to techniques described above and/or below. Accordingly, a verifier is given verification key $V_K$ and proof π:

$$V_K = \begin{Bmatrix} \mathcal{P} \\ \mathcal{Q} \\ \alpha_v \mathcal{Q} \\ \alpha_w \mathcal{Q} \\ \alpha_w \mathcal{P} \\ \alpha_y \mathcal{Q} \\ \beta \mathcal{P} \\ \beta \mathcal{Q} \\ r_y t(s) \mathcal{P} \\ r_v v_i(s) \mathcal{P} \\ r_w w_i(s) \mathcal{Q} \\ r_y y_i(s) \mathcal{P} \end{Bmatrix}_{i=0\ldots N}$$

$$\text{Proof } \pi = \begin{Bmatrix} \sum_{i=N+1}^{m} a_i r_v v_i(s) \mathcal{P} \\ \sum_{i=N+1}^{m} a_i \alpha_v r_v v_i(s) \mathcal{P} \\ \sum_{i=N+1}^{m} a_i r_w w_i(s) \mathcal{Q} \\ \sum_{i=N+1}^{m} a_i \alpha_w r_w w_i(s) \mathcal{P} \\ \sum_{i=N+1}^{m} a_i r_y y_i(s) \mathcal{P} \\ \sum_{i=N+1}^{m} a_i \alpha_y r_y y_i(s) \mathcal{P} \\ \sum_{i=N+1}^{m} a_i \begin{pmatrix} r_v \beta v_i(s) + r_w \beta w_i(s) + \\ r_y \beta y_i(s) \end{pmatrix} \mathcal{P} \\ \sum_{i=0}^{d} h_i s^i \mathcal{Q} \end{Bmatrix}$$

such that the verifier computes a plurality of elliptic curve multiplications (e.g., one for each public input variable) and five pair checks, one of which includes an additional pairing multiplication.

Given verification key $V_K$, proof π, and $(a_1, a_2, \ldots, a_N)$, to verify that t(x) divides p(x) and hence $(x_{N+1}, \ldots, x_m) = f(x_0, \ldots, x_N)$, the verifier proceeds as follows. First it checks all the three α terms:

$$e(a_v r_v V_{mid}(s) \mathcal{P}, \mathcal{Q}) = e(r_v V_{mid}(s) \mathcal{P}, \alpha_v \mathcal{Q})$$

$$e(a_w r_w V_{mid}(s) \mathcal{P}, \mathcal{Q}) = e(\alpha_w \mathcal{P}, r_w W_{mid}(s) \mathcal{Q})$$

$$e(a_y r_y V_{mid}(s) \mathcal{P}, \mathcal{Q}) = e(r_y V_{mid}(s) \mathcal{P}, \alpha_y \mathcal{Q})$$

wherein $V_{mid}(S) = \Sigma_{i=N+1}^{m} a_i v_i(s)$, $W_{mid}(s) = \Sigma_{i=N+1}^{m} a_i w_i(s)$, and $Y_{mid}(s) = \Sigma_{i=N+1}^{m} a_i y_i(s)$. Then, the verifier checks the term β:

$$e(r_v V_{mid}(s) \mathcal{P} + r_y Y_{mid}(s) \mathcal{P}, \beta \mathcal{Q}) \cdot e(\beta \mathcal{P}, r_w W_{mid}(s) \mathcal{Q}) = e(Z_{mid}(s) \mathcal{P}, \mathcal{Q})$$

and $Z_{mid}(s) = \Sigma_{i=N+1}^{m} a_i (r_v \beta v_i(s) + r_w \beta w_i(s) + r_y \beta y_i(s))$. Finally, the verifier checks the divisibility requirement:

$$e(r_v V(s) \mathcal{P}, R_w W(s) \mathcal{Q}) = e(r_y Y(s) \mathcal{P}, \mathcal{Q}) \cdot e(r_y t(s) \mathcal{P}, h(s) \mathcal{Q})$$

wherein $r_v V(s)\mathcal{P} = \Sigma_{i=0}^m r_v a_i v_i(s)\mathcal{P}$, $r_w W(s)\mathcal{Q} = \Sigma_{i=0}^m r_w a_i w(s)\mathcal{Q}$, $r_y Y(s)\mathcal{P} = \Sigma_{i=0}^m r_y a_i y(s)\mathcal{P}$, and $h(s)\mathcal{Q} = \Sigma_{i=0}^d h_i \mathcal{Q}$.

Thus, upon considering the notation from the sections described above and the examples described in this disclosure, the verification comprises a set of pair checks of the following elements, in accordance with one embodiment:

$$e(\pi_2, V_K^2) = e(\pi_1, V_K^3)$$

$$e(\pi_4, V_K^2) = e(V_K^5, \pi_3,)$$

$$e(\pi_6, V_K^2) = e(\pi_5, V_K^6)$$

$$e((\pi_1 + \pi_6), V_K^2) = e(\pi_7, V_K^2)$$

$$e((a_0 V_K^{10} + a_1 V_K^{11} + a_2 V_K^{12} + a_3 V_K^{13} + a_4 V_K^{14} + \pi_2 + a_7 V_K^{15}),$$
$$(a_0 V_K^{16} + a_1 V_K^{17} + a_2 V_K^{18} + a_3 V_K^{19} + a_4 V_K^{20} + \pi_4 + a_7 V_K^{21})) =$$
$$e((a_0 V_K^{22} + a_1 V_K^{23} + a_2 V_K^{24} + a_3 V_K^{25} + a_4 V_K^{26} + \pi_6 + a_7 V_K^{15}), V_K^2) *$$
$$e(V_K^9, \pi_8)$$

Figure 3:
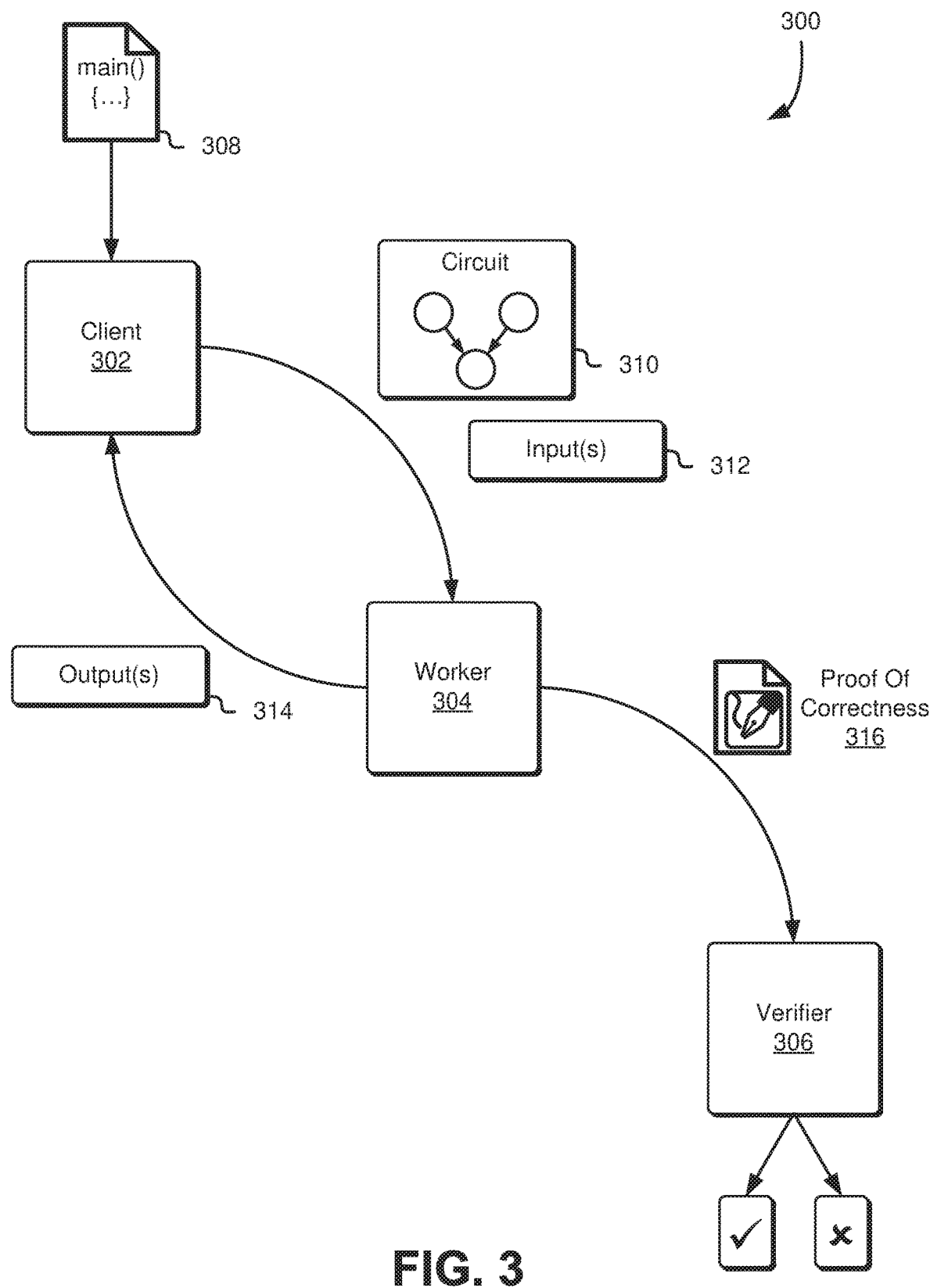
FIG. 3 illustrates a diagram of an environment suitable for performance of a verifiable computation.

FIG. 3 illustrates a diagram 300 for coordinating the performance of a verifiable computation. The client 302, worker 304, and verifier 306 may be nodes of a blockchain network. The client 302 may be any suitable computer system any may include executable code which, if executed by one or more processors of a computer system, causes the computer system to receive a smart contract 308. In an embodiment, the smart contract 308 is encoded in a high-level programming language as source code such as C, C++, or Java. In an embodiment, software such as a compiler, interpreter, and/or assembler may be utilized to transform the smart contract 308 to an arithmetic circuit 310 which consists of "wires" that carry values from a field IF and connect to addition and multiplication gates. It should be noted that the arithmetic circuit may refer to a logical circuit that can be implemented by a physical circuit comprising a series of physical gates (e.g., using transistor-transistor logic (TTL) integrated circuits such as 7400-series gates, flip-flops, buffers, decoders, multiplexers, and the like) connected by physical wires.

In an embodiment, the client 302 provides the worker 304 with an arithmetic circuit 310 and an input 312 to the circuit. The circuit 310 may be used to generate a quadratic program Q that comprises a set of polynomials that provide a complete description of the original circuit. In either case, the worker 304 may execute the circuit $\mathcal{C}$ or the quadratic program $\mathcal{Q}$ on the input 312 to generate one or more outputs 314. In some embodiments, the worker (i.e., the prover) is expected to obtain, as the output, a valid transcript for $\{\mathcal{C}, x, y\}$ that is an assignment of values to the circuit wires such that the values assigned to the input wires are those of x, the intermediate values correspond to the correct operation of each gate in $\mathcal{C}$, and the values assigned to the output wire(s) is y; if the claimed output is incorrect (i.e., $y \neq \mathcal{P}(x)$), then a valid transcript for $\{\mathcal{C}, x, y\}$ does not exist. In an embodiment, the worker is expected to provide a subset of the values of the circuit wires, wherein the selected subset of the values of the circuit wires are not known to the worker a priori.

In embodiments, the output the values of the internal circuit wires (or a subset thereof), and the evaluation key $EKE_K$ are used to produce the proof-of-correctness 316. The proof $\pi$ can be stored on the blockchain and verified by multiple parties without requiring the worker 304 to separately interact with the multiple parties. In this manner, a verifier 306 can validate the payment transaction using the public verification key $V_K$ and the proof $\pi$, thereby validating the contract. In some cases, the client 302 may reclaim digital assets encumbered by the payment transaction if the verification fails. In some cases, the verifier 306 and the client 302 are the same computer system.

Figure 4:
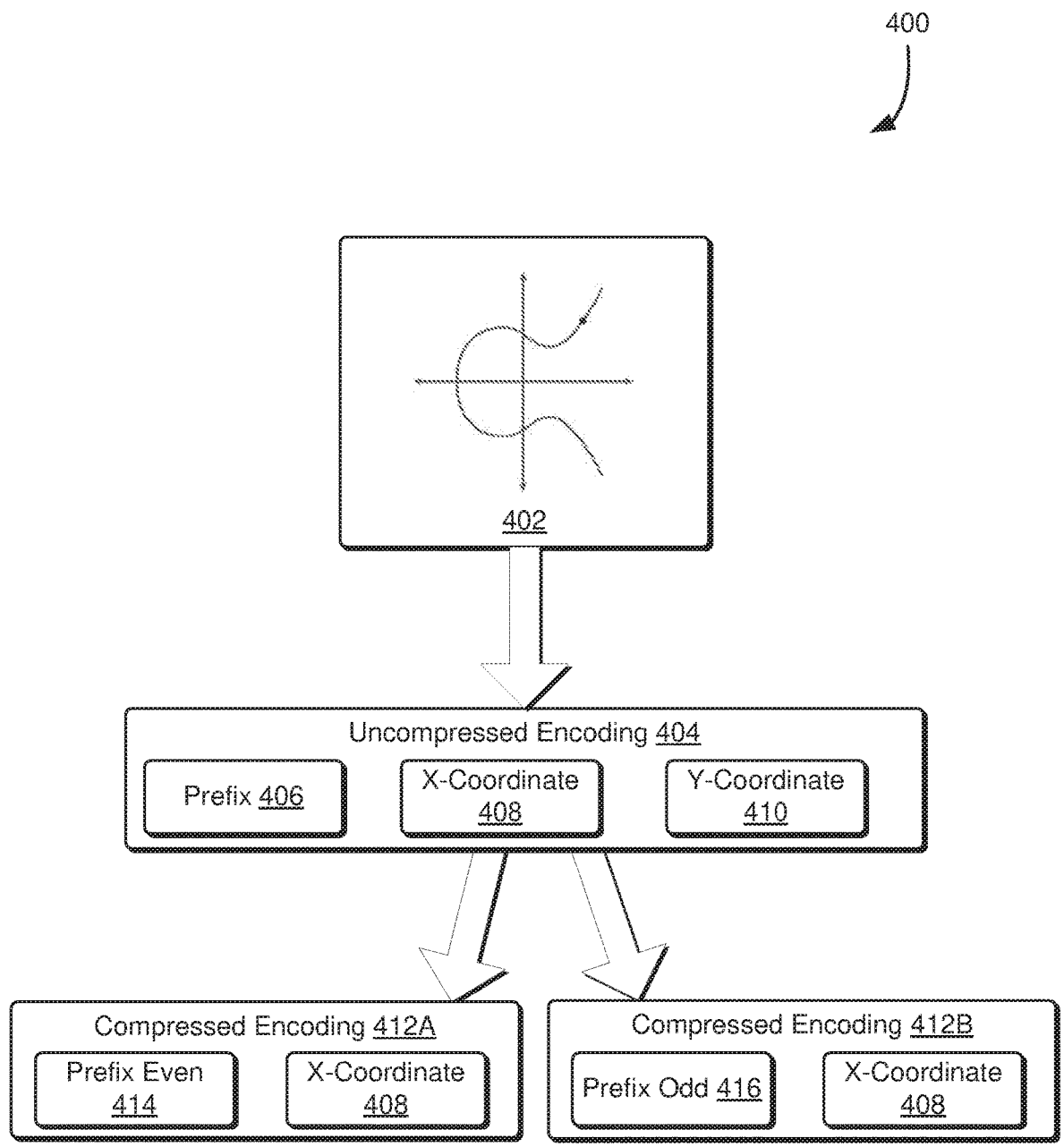
FIG. 4 illustrates an example diagram wherein a point on an elliptic curve is represented using a compressed and uncompressed encoding that is suitable for use with a blockchain script such as a locking or unlocking script, in accordance with an embodiment.

FIG. 4 illustrates a diagram 400 of an embodiment of the present disclosure. Specifically, FIG. 4 depicts a point on an elliptic curve 402 that is encoded in various formats that are suitable for use in a blockchain based script such as a Bitcoin-based locking and unlocking script.

In various embodiments, elliptic curve points may be encoded in locking and unlocking scripts that are executed in association with transactions. On a Bitcoin-based system, these scripts may be written in a stack-based scripting language. For example, the verification key $V_K$ may comprise $\{V_K^1, V_K^2, V_K^3, \ldots, V_K^n\}$ and the proof $\pi$ may comprise a set of elements $\{\pi_1, \ldots, \pi_8\}$ wherein $V_{K_j}$ and $\pi_j$ are points on an elliptic curve over a finite field $\mathbb{F}_p$, $E(\mathbb{F}_p)$. FIG. 4 illustrates an example diagram 400 wherein a point on an elliptic curve 402 is represented using either a compressed ($P_C$) or an uncompressed ($P_U$) encoding that is suitable for use with a blockchain script such as a locking or unlocking script.

In an embodiment, let $P \in E(\mathbb{F}_p)$ be a point on the elliptic curve. If $P \neq \mathcal{O}$, the point is represented by its affine coordinate. In uncompressed encoding 404 the point P is represented by information indicating an uncompressed encoding (e.g., a prefix 406 such as the parameter 'C' described below) and two field elements (x and y coordinates 408 and 410), while in the compressed encoding the point is represented only by its x-coordinate and an additional bit to uniquely identify the y-coordinate. Accordingly, in an embodiment, $P_U = C \| X \| Y$ where:

C=0x04
X=FieldElements2OctetString (x)
Y=FieldElements2OctetString (y)

wherein the double-pipe operator "||" refer to a concatenation operation and the FieldElements2OctetString( ) function can be used to convert elements of fields (e.g., finite fields) to octet strings comprising exactly eight bits. Regarding the compressed encoding, $P_C = C \| X$ where:

$$C = \begin{cases} 0x02 & \text{if } y \text{ even} \\ 0x03 & \text{if } y \text{ odd} \end{cases}$$

$$X = FieldElements2OctetString(x)$$

In an embodiment, an uncompressed encoding 404 comprises a point P of a finite field (i.e., $P \in E(\mathbb{F}_p)$) such as the x-coordinate 408 and y-coordinate 410 of a point on an elliptic curve. The uncompressed encoding 404 further comprises information usable to determine the encoding is an uncompressed encoding (e.g., a prefix 406 value prepended/appended to the x-coordinate 408 and the y-coordinate 410). Conversely, a compressed encoding 412 comprises an encoding of a pint P of a finite field (e.g., as described above) and information usable to determine the encoding is a compressed encoding. For example, a compressed encoding 412A encodes a prefix 414 and the x-coordinate 408 of a point P, wherein the corresponding y-coordinate is determinable based at least in part on the prefix 414. For example, the prefix 414 indicates the y-coordinate is even. Conversely, a second compressed encoding 412B encodes a different prefix 416 and an x-coordinate 408 of a point P, and is used to determine a y-coordinate that is odd.

It should be noted that, generally speaking, the uncompressed point $P_U$ may be expressed in any suitable format that encodes information usable to determine that $P_U$ is an uncompressed elliptic curve point, the x-coordinate of the point, and the y-coordinate of the point. Similarly, the compressed point $P_C$ may be expressed in any suitable format that encodes information usable to determine that $P_C$ is a compressed elliptic curve point and compressed information that is usable to determine the x-coordinate and y-coordinate of the point.

As an example, consider the representation of points of a secp256k1 elliptic curve in a Bitcoin-based system. In an embodiment where uncompressed points are represented, the first octet in an encoded bit string of an uncompressed elliptic curve P is 0x04 followed by two 256-bit numbers corresponding to the X coordinate of the point and the Y coordinate of the point (i.e., P=C∥X∥Y). As an example, a Distinguished Encoding Rules (DER) encoding format is used, although other suitable encoding formats are contemplated in the scope of this disclosure such as Basic Encoding Rules (BER) and Canonical Encoding Rules (CER).

In an embodiment, a one-byte script opcode including the length of the elliptic curve point is concatenated to the actual point (e.g., the length is concatenated to the front of the actual point). For example, if:
  x=0xe3b01684a8a8b66f8e44203db5869b4dcb74a0afc-905ae9197ed74a8d6cecdcc
  y=0x6424d186a23687532c8b20911defc2f42c93749b-3736857912c6abe2dc3f01d1
the compressed and uncompressed scripts $P_C$ and $P_U$ are, in an embodiment, respectively:
Script $P_C$: 0x21∥0x03e3b01684a8a8b6618e44203db-5869b4dcb74a0afc905ae9197ed74a8d6cecdcc
Script $P_U$: 0x41∥ 0x04e3b01684a8a8b66f8e44203db-5869b4dcb74a0afc905ae9197ed74a8d6cecdcc6424d1-86a23687532c8b20911defc2f42c93749b3736857912c6-abe2dc3f01d1

In an embodiment, a client is a party of a smart contract and determines to utilize a blockchain for execution of the contract. As part of the determination, the client posts a payment transition to the blockchain to transfer digital assets controlled by the client to a party (e.g., a worker) that publishes a proof $\pi$. A verifier compute system such as those described above may perform a verification routine to determine that the proof $\pi$ is correct.

In accordance with a protocol, the client may generate a common reference string for the production and generation of the proof $\pi$. In some embodiments, the common reference string is generated by a trusted party (e.g., a third party). It should be noted that while a trusted third party may generate the common reference string, that the introduction of a trusted third party to the protocol is optional—the protocol requires a client and worker and may be performed without an additional third party.

Continuing with the protocol, the verification of the computation occurs as part of the verification stage of a transaction. In an embodiment, such as a Bitcoin-based network, the client or worker is constrained to provide $\{V_K^1, V_K^2, V_K^3, \ldots, V_K^n\}$ as part of a locking script and/or an unlocking script. This constraint can be achieved in various ways. For example, in an embodiment, the worker provides the verification key $V_K$ through the injection of a serialised unlocking transaction that comprises $\{V_K^1, V_K^2, V_K^3, \ldots, V_K^n\}$ in one of its unlocking scripts. As a second example, the client broadcasts a transaction where the locking script comprises $\{V_K^1, V_K^2, V_K^3, \ldots, V_K^n\}$ and equations utilized in the Validation phase and creates a transaction input signed with SIGHASH_NONE|SIGHASH_ANYONECANPAY that comprises verification key $V_K$. The client passes this input to the worker, who needs to add $\{\pi_1, \ldots, \pi_8\}$, sign, and broadcast. As yet another example, the worker provides verification key $V_K$ by using a fixed-length script hash (e.g., 20-byte script hash) in the locking script of the transaction paying for the execution. Of course, these are merely illustrative examples of how $\{V_K^1, V_K^2, V_K^3, \ldots, V_K^n\}$ are provided as part of a locking script, an unlocking script, or any other suitable scripts or operations that are executed as part of the verification of a transaction in accordance with any suitable blockchain protocol. In an embodiment, the worker provides $\{\pi_1, \ldots, \pi_8\}$ as part of an unlocking script and the proof $\pi$ is authorised if it meets the conditions set in the output script.

A blockchain-based system such a Bitcoin-based system, in an embodiment, supports execution of operations (also referred to as opcodes and commands) in accordance with a scripting language such as Script (e.g., Bitcoin-based systems support Script). In an embodiment, a transaction comprises locking (output) and unlocking (input) scripts and can be identifiable as one of a list of standard types. For example, in a Bitcoin-based system, there are five standard types: Pay-to-Public-Key (P2PK), Pay-to-Public-Key-Hash (P2PKH), Multi-signature, Pay-to-Script-Hash (P2SH), and OP_RETURN.

In running the proposed zk-protocol as described herein, information such as the common reference string, the proof $\pi$, and/or portions thereof are stored on the blockchain. Furthermore, as part a validation process, it may also the case that a system is to extract specific elements pushed on the stack in the transaction validation process and check the pairing from the validation phase as described above.

Transactions may include small programs known as scripts embedded into their inputs and outputs, which specify how and by whom the outputs of the transactions can be accessed. On the Bitcoin platform, these scripts are written using a stack-based scripting language. In an embodiment, a protocol includes various technical rules and syntax-based restrictions on transactions that determine whether a transaction is a standard transaction or a non-standard transaction. In an embodiment, there are restrictions to the size of elements pushed on the execution stack and on the total size of input scripts. For example, in a Bitcoin-based system, every element pushed on the execution stack is limited to 520 bytes and each input script is limited to 1650 bytes. In an embodiment, after the script execution, the stack includes exactly one non-false element. Input scripts cannot include any OP codes other than OP_PUSHDATA (except for the redeem script portion). In an embodiment, a Bitcoin-based system requires a minimum output value of 546 satoshis, although it should be noted that different blockchain systems may define a different amount and/or unit of digital assets to be included as an output value (e.g., a minimum payment to the mining nodes of the transaction). In an embodiment, the minimum output value is zero (i.e., there is no required transferred of digital assets). Transactions that deviate from these rules are considered non-standard.

As part of the validation phase, a verifier (e.g., the client) extracts elements of the verification key $V_K$ and proof $\pi$ and uses them in pairing checks. In an embodiment, the verification check comprises a bilinear mapping that satisfies a set of constraints. As an example, consider a bilinear mapping $e(x,y)=2^{xy}$) that satisfies constraints of the form $e(V_K^1,\pi_1+\pi_2)=e(V_K^1,\pi_1)*e(V_K^1,\pi_2)$, such as in the following manner:

$$e(3,4+5)=2^{3*9}=2^{27}$$

$$e(3,4)*e(3,5)=2^{3*4}2^{3*5}=2^{12}2^{15}=2^{27}$$

It should be noted that such a pairing described above is for illustrative purposes—while such a mapping may not be useful, verbatim, for application in cryptographic systems, it should be noted that the process for verifying the bilinear constraints remains the same wherein the bilinear maps are extended over elliptic curves. Again, for illustrative purposes, an example for how to extract and use information from the common reference string (e.g., the verification key $V_K$) and proof $\pi$ in the validation phase using Bitcoin scripts is shown below:

```
OP_IF
//verify the integrity of the V_K
<PubKey Alice> OP_CHECKSIGVERIFY
OP_0 OP_PICK OP_DUP <V_K^6> OP_EQUALVERIFY
OP_1 OP_SUB OP_PICK OP_DUP <V_K^5> OP_EQUALVERIFY
OP_(|V_K| - i) OP_SUB OP_PICK OP_DUP <V_K^i> OP_EQUALVERIFY
//verify the pairings
//e(π_2, V_K^2) = e(π_1, V_K^3)
//left part
OP_DEPTH OP_3 OP_SUB OP_PICK
OP_5 OP_PICK OP_PAIRING OP_TOALTSTACK
//right part
OP_DEPTH OP_2 OP_SUB OP_PICK
OP_4 OP_PICK OP_PAIRING OP_TOALTSTACK
//empty the stack
14*times {OP_DROP}
OP_FROMALTSTACK OP_FROMALTSTACK OP_EQUALVERIFY [1]
//for e(π_1, V_K^j)
OP_DEPTH OP_(i + 1) OP_SUB OP_PICK
OP_(|V_K| - j + 1) OP_PICK
OP_PAIRING OP_TOALTSTACK
//for e(V_K^j, π_1)
OP_(|V_K| - j ) OP_PICK
OP_DEPTH OP_(i + 1) OP_SUB OP_PICK
OP_PAIRING OP_TOALTSTACK
    <PubKey Bob> OP_CHECKSIG
OP_ELSE
    <n days> OP_CHECKSEQUENCEVERIFY
    <PubKey Alice > OP_CHECKSIG
OP_ENDIF
```

| | |
|---|---|
| Verification Key | $V_K = \{V_K^1, V_K^2, V_K^3, V_K^4, V_K^5, V_K^6\}$ |
| Proof | $\pi = \{\pi_1, \pi_2, \pi_3, \ldots, \pi_8\}$ |
| Validation check | $e(\pi_2, V_K^2) = e(\pi_1, V_K^3)$ |
| | $e(\pi_4, V_K^2) = e(V_K^5, \pi_3,)$ |
| | $e(\pi_6, V_K^2) = e(\pi_5, V_K^6)$ |
| | $\ldots$ |

It should be noted that in the example provided above is merely used to illustrate examples of pair checks and may include additional constraints, such as those discussed, above, in connection with FIG. 2.

Figure 5:
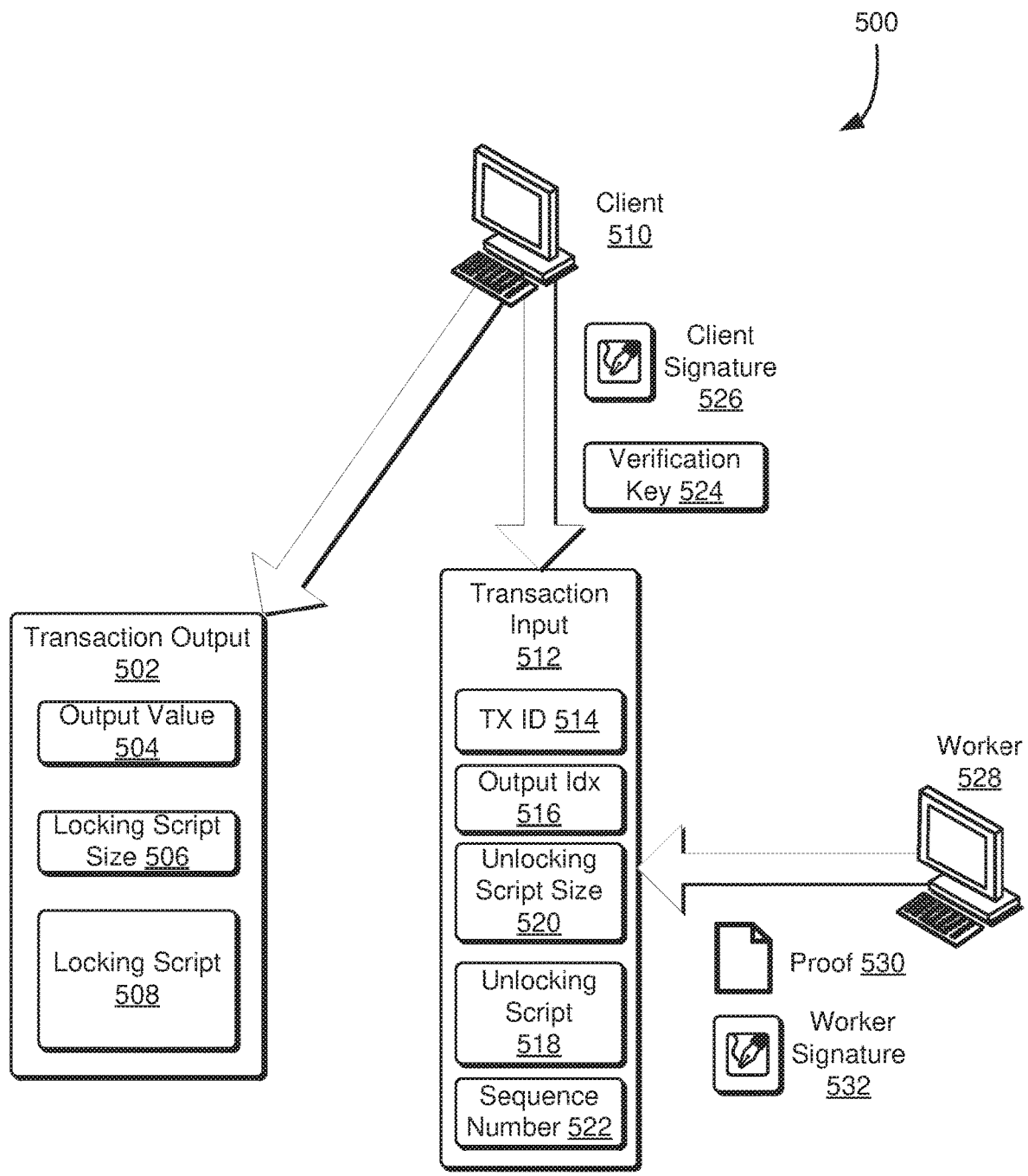
FIG. 5 illustrates a diagram wherein a client supplies the verification key to be used in validation of a proof.

There are various techniques for providing the verification key $V_K$ for use in connection with the validation of a proof $\pi$. FIG. 5 is an illustrative diagram 500 where a client 510 supplies the verification key $V_K$ to be used in validation of a proof $\pi$. In an embodiment, a client creates a transaction output 502, wherein the transaction comprises or is otherwise associated with an output value 504 (e.g., payment of digital assets to a worker for contract execution) and a locking script 508 that performs a verification check comprising a bilinear mapping that satisfies a set of constraints. In an embodiment, the locking script verifies the integrity of the verification key $V_K$ based at least in part on a digital signature of the client. In some cases, the locking script may specify that if the validation fails, the client is able to re-claim the digital assets as described above, in connection with the transaction. Such a transaction may be sent to a blockchain network to be mined by nodes of the blockchain network (e.g., workers). In some blockchain systems, the transaction encodes, in association with the locking script, a parameter indicating the size (e.g., in bytes) of the locking script, which may be referred to as the locking script size 506, such as is illustrated in connection with FIG. 5.

As an example, a locking script may be described based on the following:

It should be noted that the example provided above is descriptive of a locking script and not necessarily, verbatim, a locking script 508 itself. For example some fields above that are described in brackets—such as "<PubKey Client>" which may refer to the client's public key—are not included, verbatim, in a locking script 508. Similarly, some fields in parentheses may be based on a mathematical computation—for example, "OP_(i+1)" as described above may not be included, verbatim, in a locking script, but rather refers to an opcode or command that is determined based at least in part on a mathematical computation—in this case, 'i' refers to the number of elements of proof $\pi$ and, accordingly, in an example where proof $\pi=\{\pi_1, \ldots, \pi_8\}$ "OP_(i+1)" may, in a locking script, be represented as "OP_7" in a stack-based scripting language. It should further be noted that text following the double slashes "//" above refer to comments which do not correspond to executable code. For example, "//verify the pairings" does not map to executable code and merely indicates, to a human, that the text following the comment is utilized to perform a verification of the pairings.

It should be noted, again, that the transaction output 502 as described above is merely illustrative and that may such variations may exist—the transaction may include any suitable payment amount in any suitable unit of measurement, and that various locking scripts may exist, such as those that utilize some or all functionality of locking scripts as described above. Generally speaking, a locking script 508 may be any suitable set of commands that performs a set of pairing check. In an embodiment, the locking script 508 includes an integrity check of the verification key $V_K$ using at least an asymmetric public key associated with the client. In an embodiment, a locking script allows a client to reclaim digital assets if the validation fails. In an embodiment, the locking script 508 includes instructions to mark the transaction as invalid after a threshold duration (e.g., a value corresponding to "<n days>" as described above).

The client 510, which may be a client such as those described elsewhere in this disclosure, may create a transaction input 512 that references the transaction 502 described above and transmits it to a counterparty (e.g., a worker that will purported compute a valid proof $\pi$). In an embodiment, the transaction input 512 may encode an identifier 514 associated with the transaction output 502, a transaction output index 516 associated with the transaction output 502 (e.g., in some cases, the index is zero-based), an unlocking script 520, a parameter indicating the size (e.g., in bytes) of the unlocking script, which may be referred to as the unlocking script size 518, a sequence number 522, and any suitable combination thereof. For example, in some embodiments, the unlocking script size is not explicitly encoded in the transaction input 512 and is otherwise derivable (e.g., through the detection of a specific terminating sequence that indicates the end of the unlocking script. In an embodiment, the unlocking script 518 comprises the verification key $V_K$ 524 and a digital signature 526 associated with the client. In some cases, the unlocking script 518 includes additional information, such as an indication of branching information that controls the execution the verification process.

As an example, an unlocking script may be described based on the following:

$<V_K^1><V_K^2><V_K^3><V_K^4><V_K^5><V_K^6><Sig\ A>1$

It should be noted that the example provided above is descriptive of an unlocking script and not necessarily, verbatim, an unlocking script itself. For example some fields above that are described in brackets are not included, verbatim, in an unlocking script 518. Returning to the example above, which is descriptive of an unlocking script, an unlocking script 518 may comprise an ordered or unordered sequence of elements of a verification key $V_K$ 524, a digital signature 526 associated with the client, and branching information. In an embodiment, the digital signature 526 includes a hash type flag. In an embodiment, the hash flag is SIGHASH_NONE|SIGHASH_ANYONECANPAY in accordance with a Bitcoin-based system. An unlocking script 518 may comprise execution control information that is usable in conjunction with the locking script to validate a transaction. For example, in the example described above, the "1" indicates that the script should go into the first branch of a control statement in an unlocking script (e.g., an OP_IF branch instead of an OP_ELSE branch).

In an embodiment, the worker 528 computes a proof $\pi$530 and appends it with a digital signature 532 associated with the worker to the unlocking script 518 and broadcasts the transaction (e.g., to the client and/or one or more nodes of a blockchain network).

As an example, an unlocking script having the proof and the worker's digital signature may be described based on the following:

$<Sig\ B><\pi_1><\pi_2>$
$<\pi_8><V_K^1><V_K^2><V_K^3><V_K^4><V_K^5><V_K^6><Sig\ A>1$.

Accordingly, in an embodiment, an unlocking script in accordance with the description immediately above is able to satisfy the conditions placed on the output by the locking script and may allow the digital assets (e.g., as indicated by an output value) to be spent.

Figure 6:
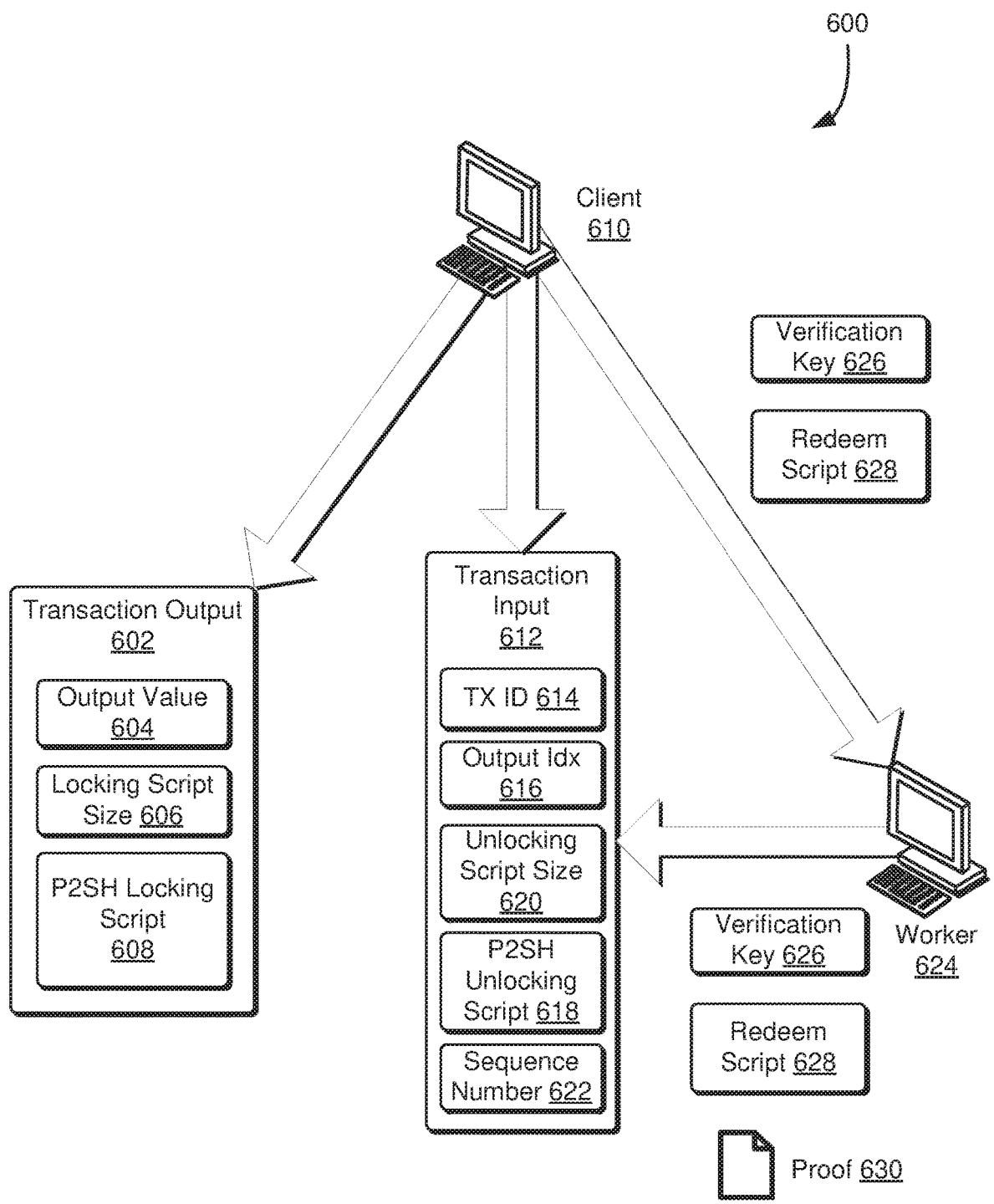
FIG. 6 illustrates a diagram wherein a worker supplies the verification key to be used in validation of a proof.

There are various techniques for providing the validation key $V_K$ for use in connection with the validation of a proof $\pi$. FIG. 6 is an illustrative diagram 600 where a worker supplies the verification key $V_K$ to be used in validation of a proof $\pi$. The transaction output 602 may be in accordance with a Bitcoin-based system and may comprise an output value 604, a locking script 606 (optionally, in some systems), and a locking script 608. In an embodiment, the transaction is a Pay-to-Script-Hash (P2SH) transaction in accordance with a Bitcoin-based system. In an embodiment, the transaction output 612 is in accordance with a Bitcoin-based system and comprises a transaction ID 614, an output index 616, an unlocking script size 618, an unlocking script 618, and a sequence number 622 as described in connection with FIG. 5 above. It should be noted that while the structure of a transaction described in FIG. 6 may be in accordance with those described in FIG. 5, FIG. 6 may include, in particular, a locking script 608 and unlocking script 618 in accordance with a P2SH transaction. The client 610 may generate the verification key $V_K$ and the redeem script 628 and provide them to the worker 624.

In an embodiment, a blockchain system supports various types of transactions. In an embodiment, a supported transaction (e.g., a standard transaction) is a script-hash-based transaction such as a Pay-to-Script-Hash (P2SH) transaction in accordance with a Bitcoin-based system. Generally speaking, a script-hash-based transaction refers to any transaction wherein verifying the validity of an unlocking script includes providing a script that matches a specified hash value. For example, in a Bitcoin-based P2SH transaction, an unlocking script 620 comprises a redeem script 628 and a locking script 608 comprises at least one condition that the hash of the redeem script supplied by the unlocking script matches a specified value. For example, in a Bitcoin-based system, a locking script may be described based on the following:

OP_HASH160<20-byte hash of redeem script>OP_EQUAL

In some cases, the worker 624 provides the verification key $V_K$ 626 to be used in the validation phase. The unlocking conditions that check the Validation Phase can, in an embodiment, be stored in a redeem script. In an embodiment, the locking script of the P2SH transaction comprises a hash of the redeem script and in some cases, the redeem script is kept secret (e.g., encrypted by the worker) and is only revealed upon an indication to cause the transfer of the output value.

In an embodiment, a client 610 creates a P2SH unspent transaction output by identifying a redeem script and applies a hash to it (e.g., HASH160). To transfer the UTXO, the client creates an input script (which references the UTXO) that includes and/or otherwise references the redeem script. It should be noted that, in an embodiment, the redeem script is suitable to store arbitrary data, although a blockchain-based system may have restrictions on the type or amount of data that may be included in a redeem script. For example, in connection with Bitcoin-based systems there may be limitations on the size of data that can be published to the stack (e.g., a PUSHDATA operation is limited to 520 bytes of data). In an embodiment, a redeem script comprises compressed and uncompressed points $P_C$ and $P_U$, respectively, as described in connection with FIG. 4. Accordingly, set of constraints and the unlocking script comprises a proof $\pi$, wherein the redeem script and unlocking script together comprise a set of commands sufficient to validate the payment transaction.

For example, in the case where the cardinality of the verification key $V_K$ is smaller than 16 it may be that:

| | |
|---|---|
| Redeem Script | $<V_K^1><V_K^2><V_K^3><V_K^4><V_K^5><V_K^6>$ |
| | OP_DEPTH OP_3 OP_SUB OP_PICK OP_5 OP_PICK OP_PAIRING |
| | OP_TOALTSTACK OP_DEPTH OP_2 OP_SUB OP_PICK OP_4 OP_PICK |
| | OP_PAIRING OP_TOALTSTACK 14*{OP_DROP} OP_FROMALTSTACK |
| | OP_FROMALTSTACK OP_EQUALVERIFY [1] |
| | OP_DEPTH OP_5 OP_SUB OP_PICK OP_5 OP_PICK OP_PAIRING |
| | OP_TOALTSTACK OP_1 OP_PICK OP_DEPTH OP_3 OP_SUB OP_PICK |
| | OP_PAIRING OP_TOALTSTACK 14*{OP_DROP} OP_FROMALTSTACK |
| | OP_FROMALTSTACK OP_EQUALVERIFY [2] |
| Unlocking Script | OP_1 $<\pi_1><\pi_2>\ldots<\pi_8>$ <Redeem Script> |
| Locking Script | OP_HASH160 <20-byte-hash of [Redeem Script]> OP_EQUAL | in an embodiment, the maximum number of elliptic curve points that can be stored in a redeem script in accordance with a Bitcoin-based protocol is 15 compressed (e.g., 15 points*34 bytes/point=510 bytes) or 7 uncompressed points (7 points*66 bytes/point=462 bytes). In an embodiment, the unlocking script 618 comprises the proof 630, the redeem script 628, and commands (e.g., opcodes) that may, collectively, be used to satisfy a set of conditions encoded in the locking script 608.

Figure 7:
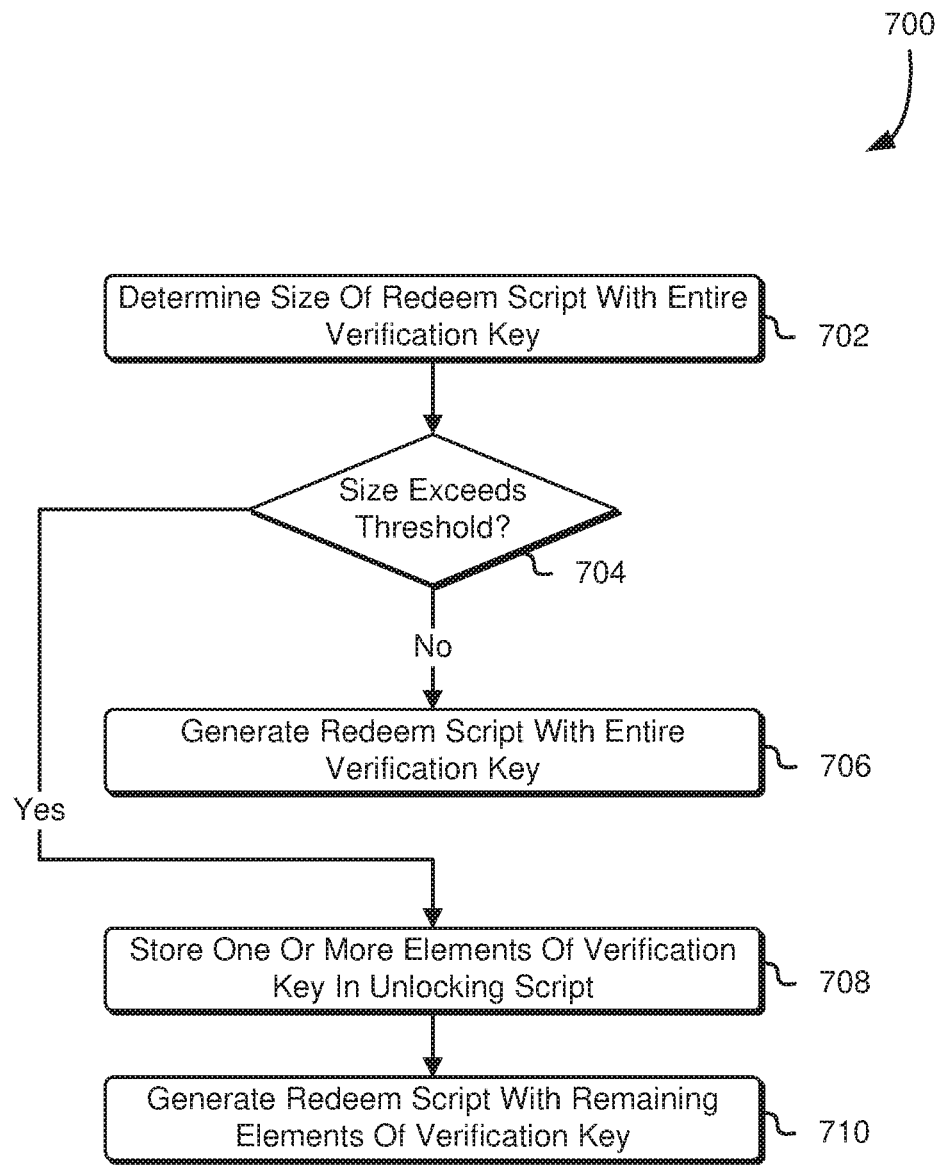
FIG. 7 illustrates a diagram of a process 700 for generating a redeem script in accordance with an embodiment.

FIG. 7 is an illustrative diagram of a process 700 for generating a redeem script in accordance with an embodiment. In an embodiment, the process 700 is implemented using hardware, software, or a combination thereof. A suitable system for performing the process includes a worker that supplies a P2SH unlocking script in connection with the discussions of FIG. 6.

In an embodiment, the system determines the verification key $V_K$ is of a sufficient cardinality. In an embodiment, the system determines 702 the size of a redeem script comprising each element of the verification key and a script to check a set of constraints, wherein the redeem script and a proof $\pi$ are sufficient to unlock a corresponding locking script. The system may determine whether 704 the size of such a redeem script exceed a predetermined threshold, which may be based on a size limit imposed by the blockchain protocol—for example, a blockchain protocol may require the redeem script be less than or equal to 520-bytes in size. If redeem script is of a sufficient size, the system generates 706 a redeem script and unlocking script wherein the redeem script comprises the verification key and a script to check a wherein the redeem script and unlocking script are sufficient to unlock the locking script.

If the redeem script exceeds the predetermined threshold, the system generates 708 a unlocking script that stores one or more elements of the verification key $V_K$ in the part of the unlocking script that precedes the redeem script so that the total size of the redeem script is within the threshold and generates 710 a redeem script with the elements of the verification key and the constraints as described above. In an embodiment, the one or more elements verification key $V_K$ may be encoded elsewhere in the unlocking script. For example, in the case where the cardinality of $V_K$ is greater than 15 it may be that:

| | |
|---|---|
| Redeem Script | OP_DUP OP_TOALTSTACK OP_HASH160 <20-byte-hash of $V_K^6$> |
| | OP_EQUALVERIFY OP_DUP OP_TOALTSTACK OP_HASH160 <20-byte-hash of $V_K^5$> |
| | OP_EQUALVERIFY OP_DUP OP_TOALTSTACK |
| | OP_HASH160 <20-byte-hash of $V_K^4$> OP_DUP OP_TOALTSTACK |
| | OP_HASH160 <20-byte-hash of $V_K^3$> OP_EQUALVERIFY OP_DUP |
| | OP_TOALTSTACK OP_HASH160 <20-byte-hash of $V_K^2$> |
| | OP_EQUALVERIFY OP_DUP OP_TOALTSTACK OP_HASH160 <20-byte-hash of $V_K^1$> |
| | OP_EQUALVERIFY OP_FROMALTSTACK |
| | OP_FROMALTSTACK OP_FROMALTSTACK OP_FROMALTSTACK |
| | FROMALTSTACK OP_FROMALTSTACK |
| | OP_DEPTH OP_3 OP_SUB OP_PICK OP_5 OP_PICK OP_PAIRING |
| | OP_TOALTSTACK OP_DEPTH OP_2 OP_SUB OP_PICK OP_4 OP_PICK |
| | OP_PAIRING OP_TOALTSTACK 14*{OP_DROP} OP_FROMALTSTACK |
| | OP_FROMALTSTACK OP_EQUALVERIFY [1] |
| Unlocking Script | OP_1 $<\pi_1><\pi_2>\ldots<\pi_8><V_K^1><V_K^2><V_K^3><V_K^4>$ $<V_K^5><V_K^6>$ < Redeem Script > |
| Locking Script | OP_HASH160 <20-byte-hash of [Redeem Script]> OP_EQUAL | wherein the redeem script and unlocking script are sufficient to unlock the locking script.

Thus, by encoding the stages necessary in the Validation phase in a locking script, the validation of the transaction should become an equivalent process with the Validation phase of a zk-protocol. In an embodiment, an OP_VERIFYPROOF op code can be used as follows:

| Type | Script |
|---|---|
| Unlocking Script | OP_1 $<\pi_1><\pi_2>\ldots<\pi_8><V_K^1><V_K^2>$ $<V_K^3><V_K^4><V_K^5><V_K^6>$ |
| Locking Script | // extract $\pi_i$ |
| | OP_DEPTH OP_(i + 1) OP_SUB OP_PICK |
| | // extract $V_K^j$ |
| | OP_($|V_K|$ − j + 1) OP_PICK |
| | // pairing call |

-continued

| Type | Script |
|---|---|
| | OP_PAIRING OP_TOALTSTACK |
| | // extract $\pi_k$ |
| | OP_DEPTH OP_(k + 1) OP_SUB OP_PICK |
| | // extract $V_K^m$ |
| | OP_($|V_K|$ − m + 1) OP_PICK |
| | // pairing call |
| | OP_PAIRING OP_TOALTSTACK |
| | //empty the stack |
| | ($|V_K|$ + $|\pi|$) * OP_DROP |
| | // verify the result of the operation |
| | OP_FROMALTSTACK OP_FROMALTSTACK |
| | OP_EQUALVERIFY |

The unlocking and locking scripts may be implemented in any suitable manner. The unlocking script is implemented in any suitable manner wherein the unlocking script encodes <$\pi_1$> . . . <$\pi_8$> and the verification key $V_K$. Similarly, the locking script may be implemented in any suitable manner in which $\pi_i$ and $V_K^j$ are extracted and a pairing call is made. In an embodiment, OP_PAIRING as described above is an op code that supports elliptic curves with efficient bilinear mappings such as a bn128 curve defined by the equation $y^2=x^3+3$.

FIG. 8 is an illustrative, simplified block diagram of a computing device 800 that can be used to practice at least one embodiment of the present disclosure. In various embodiments, the computing device 800 can be used to implement any of the systems illustrated and described above. For example, the computing device 800 can be configured for use as a data server, a web server, a portable computing device, a personal computer, or any electronic computing device. As shown in FIG. 8, the computing device 800 could include one or more processors 802 that, in embodiments, communicate with and are operatively coupled to a number of peripheral subsystems via a bus subsystem 804. In some embodiments, these peripheral subsystems include a storage subsystem 806 comprising a memory subsystem 808 and a file/disk storage subsystem 810, one or more user interface input devices 812, one or more user interface output devices 814, and a network interface subsystem 816. Such storage subsystem 806 could be used for temporary or long-term storage of information.

In some embodiments, the bus subsystem 804 provides a mechanism for enabling the various components and subsystems of computing device 800 to communicate with each other as intended. Although the bus subsystem 804 is shown schematically as a single bus, alternative embodiments of the bus subsystem utilize multiple busses. In some embodiments, the network interface subsystem 816 provides an interface to other computing devices and networks. The network interface subsystem 816, in some embodiments, serves as an interface for receiving data from and transmitting data to other systems from the computing device 800. In some embodiments, the bus subsystem 804 is utilised for communicating data such as details, search terms, and so on.

In some embodiments, the user interface input devices 812 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 800. In some embodiments, the one or more user interface output devices 814 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 800. The one or more user interface output devices 814 can be used, for example, to present user interfaces to facilitate user interaction with applications performing processes described and variations therein, when such interaction may be appropriate.

In some embodiments, the storage subsystem 806 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 806. These application modules or instructions can be executed by the one or more processors 802. In various embodiments, the storage subsystem 806 additionally provides a repository for storing data used in accordance with the present disclosure. In some embodiments, the storage subsystem 806 comprises a memory subsystem 808 and a file/disk storage subsystem 810.

In embodiments, the memory subsystem 808 includes a number of memories, such as a main random access memory (RAM) 818 for storage of instructions and data during program execution and/or a read only memory (ROM) 820, in which fixed instructions can be stored. In some embodiments, the file/disk storage subsystem 810 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 800 includes at least one local clock 824. The local clock 824, in some embodiments, is a counter that represents the number of ticks that have transpired from a particular starting date and, in some embodiments, is located integrally within the computing device 800. In various embodiments, the local clock 824 is used to synchronize data transfers in the processors for the computing device 800 and the subsystems included therein at specific clock pulses and can be used to coordinate synchronous operations between the computing device 800 and other systems in a data centre. In another embodiment, the local clock is a programmable interval timer.

The computing device 800 could be of any of a variety of types, including a portable computer device, tablet computer, a workstation, or any other device described below. Additionally, the computing device 800 can include another device that, in some embodiments, can be connected to the computing device 800 through one or more ports (e.g., USB, a headphone jack, Lightning connector, etc.). In embodiments, such a device includes a port that accepts a fibre-optic connector. Accordingly, in some embodiments, this device is that converts optical signals to electrical signals that are transmitted through the port connecting the device to the computing device 800 for processing. Due to the ever-changing nature of computers and networks, the description of the computing device 800 depicted in FIG. 8 is intended only as a specific example for purposes of illustrating the preferred embodiment of the device. Many other configurations having more or fewer components than the system depicted in FIG. 8 are possible.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

All references, including publications, patent applications, and patents, cited herein are hereby incorporated by reference to the same extent as if each reference were individually and specifically indicated to be incorporated by reference and were set forth in its entirety herein.

The invention claimed is:

1. A computer-implemented method comprising:
generating a transaction output of a transaction comprising an indication of a digital asset and a locking script that encodes a set of conditions for transferring control of the digital asset, satisfaction of the set of conditions to be determined based at least in part on a verification key and a proof;
generating a transaction input of the transaction, the transaction input comprising:
an identifier associated with the transaction output; and
an unlocking script comprising the proof; and
verifying the set of conditions are satisfied based at least in part on the locking script and the unlocking script; and
transferring control of the digital asset in response to verifying satisfaction of the set of conditions,
wherein a client encodes the transaction input with the verification key and a first digital certificate associated with the client and a worker encodes the transaction input with the proof and a second digital certificate associated with the worker.

2. The computer-implemented method according to claim 1, wherein the verification key comprises a first plurality of elements of a finite field and the proof comprises a second plurality of elements of the finite field.

3. A system, comprising:
a processor; and
memory including executable instructions that, as a result of being executed by the processor, causes the system to perform the computer-implemented method according to claim 2.

4. A non-transitory computer-readable storage medium having stored thereon executable instructions that, as a result of being executed by a processor of a computer system, cause the computer system to at least perform the computer-implemented method according to claim 2.

5. The computer-implemented method according to claim 2, wherein elements of the finite field are points on an elliptic curve.

6. A system, comprising:
a processor; and
memory including executable instructions that, as a result of being executed by the processor, causes the system to perform the computer-implemented method according to claim 5.

7. A non-transitory computer-readable storage medium having stored thereon executable instructions that, as a result of being executed by a processor of a computer system, cause the computer system to at least perform the computer-implemented method according to claim 5.

8. The computer-implemented method according to claim 2, wherein the elements of the finite field are encoded in a compressed format.

9. A system, comprising:
a processor; and
memory including executable instructions that, as a result of being executed by the processor, causes the system to perform the computer-implemented method according to claim 8.

10. The computer-implemented method according to claim 1, wherein the locking script comprises instructions that, contingent upon a condition of the set of conditions being unsatisfied by the unlocking script, reclaim the digital asset for a provider of the digital asset.

11. The computer-implemented method according to claim 1, wherein:
the unlocking script further comprises a redeem script, wherein the verification key and the redeem script are to satisfy the set of conditions; and
the locking script encodes a condition of the set of conditions that a hash of the redeem script matches a predetermined value.

12. The computer-implemented method according to claim 11, wherein the redeem script is less than or equal to 520 bytes in size.

13. The computer-implemented method according to claim 11, wherein the unlocking script comprises one or more elements of the verification key.

14. The computer-implemented method according to claim 11, wherein the transaction is a P2SH transaction in accordance with a Bitcoin-based protocol.

15. The computer-implemented method according to claim 1, wherein the transaction is a standard transaction in accordance with a blockchain-based protocol.

16. The computer-implemented method according to claim 1, wherein the locking script and unlocking script are encoded in a stack-based scripting language.

17. The computer-implemented method according to claim 1, wherein the set of conditions comprise a bilinear constraint.

18. A system, comprising:
a processor; and
memory including executable instructions that, as a result of being executed by the processor, causes the system to perform the computer-implemented method according to claim 1.

19. A non-transitory computer-readable storage medium having stored thereon executable instructions that, as a result of being executed by a processor of a computer system, cause the computer system to at least perform the computer-implemented method according to claim 1.

* * * * *